United States Patent [19]

Correa et al.

[11] Patent Number: 5,416,391
[45] Date of Patent: May 16, 1995

[54] ELECTROMECHANICAL TRANSDUCTION OF PLASMA PULSES

[76] Inventors: Paulo N. Correa; Alexandra N. Correa, both of 42 Rockview Gardens, Concord, Ontario, Canada, L4K 2J6

[21] Appl. No.: 961,531

[22] Filed: Oct. 15, 1992

Related U.S. Application Data

[63] Continuation-in-part of Ser. No. 922,863, Jul. 31, 1992, abandoned.

[51] Int. Cl.[6] .............................................. H03K 3/37
[52] U.S. Cl. .................... 318/558; 307/106; 313/581
[58] Field of Search .................. 318/558, 700, 727; 307/106; 313/581; 361/230, 231; 378/122

[56] References Cited

U.S. PATENT DOCUMENTS 3,205,162  9/1965  MacLean .
3,471,316 10/1969  Manuel .
3,628,164 12/1971  Tikhomirov .
3,663,855  5/1972  Boettcher .
3,678,510  7/1972  Walthard et al. .
4,063,130 12/1977  Hunter, Jr. .
4,194,239  3/1980  Jayaram et al. .

*Primary Examiner*—Bentsu Ro
*Attorney, Agent, or Firm*—Ridout & Maybee

[57] ABSTRACT

A direct current power transducer for driving alternating current devices utilizes a discharge tube connected across a current source, the construction of the tube and characteristics of the source being such as to maintain endogenous pulsed abnormal gas discharge within the tube. The tube is capacitively coupled to an external load including an alternating current device, typically an electric motor. Electric motors of the asynchronous induction or synchronous types are particularly suitable, but other alternating current devices may be used. By adjustments to the current source, the capacitance in parallel with the discharge tube, and connections to auxiliary electrodes, the pulse repetition frequency of the discharge may be adjusted, thus allowing variable speed control of types of alternating current motor not normally amenable to such control.

13 Claims, 14 Drawing Sheets

ELECTROMECHANICAL TRANSDUCTION OF PLASMA PULSES

REFERENCE TO RELATED APPLICATION

This application is a continuation-in-part of our patent application Ser. No. 07/922,863, filed Jul. 31, 1992, now abandoned.

BACKGROUND OF THE INVENTION

1. Field of the Invention

This invention relates to a high power gas discharge tube of novel characteristics, and to applications of the tube in the control of electric motors and other alternating current devices.

2. Review of the Art

As the current passed through a gas discharge tube is increased beyond the levels at which normal glow discharge takes place, such normal gas discharge being characterized by a negative resistance characteristic leading to decreasing potential between the cathode and anode electrodes of the tube, a region of abnormal glow discharge is entered in which the negative resistance characteristic changes to a positive resistance characteristic leading to increasing potential between the electrodes. Typically this increased potential rapidly leads to breakdown into vacuum arc discharge between the electrodes, again characterized by a negative resistance characteristic. Accordingly, gas discharge tubes have been operated in the normal glow discharge or vacuum arc regimes in which stable operation can be achieved by suitable ballasting of the tube, the former regime being suitable for low current applications and the latter for high current. It is possible to utilize a normal glow discharge tube in a low frequency oscillator circuit by placing capacitance in parallel with the tube and in series with the ballast because such a tube is characterized by a comparatively high striking potential at which discharge is initiated, and a lower but still high extinction potential at which discharge ceases. Operation in such a mode with vacuum arc devices is difficult because, in order to turn off the device effectively, the arc must be extinguished or otherwise interrupted or divested for long enough to disperse the intense ionization formed in its path.

Devices operating in the vacuum arc regime have other problems, particularly in terms of ensuring adequate electrode life, which have led to gas diodes and triodes (thyratrons) being superseded by semiconductor devices in most applications. A further limitation of such devices is that the great difficulty in turning them off, except by terminating current flow through the device for a finite period, limits their usefulness as control devices to rectification, current turn-on and low frequency alternating current applications.

The only prior art of which we are aware which successfully exploits the abnormal glow discharge regime is the process described in U.S. Pat. No. 3,471,316 (Manuel) issued Oct. 7, 1969, which we understand is commercially utilized in forming organic coatings on metal cans. It relies on the application of externally generated current pulses to force a discharge tube temporarily into the abnormal glow discharge region, the pulses being sufficiently short that no vacuum arc is established. There is no disclosure of any endogenous pulsed abnormal glow discharge, the apparatus is dependent upon an external pulse generator to operate, and its utility is completely different from the present invention because it uses externally generated pulses rather than generating such pulses.

We are also aware that the use of vacuum arc discharge tubes has been proposed for the control of inverters, as exemplified by U.S. Pat. No. 4,194,239 (Jayaram et al), which discloses the use of vacuum arc discharge tubes in which the discharge is steered magnetically between multiple electrodes to provide a commutating effect. Such an arrangement acknowledges the difficulty of extinguishing a vacuum arc, and seeks to overcome the difficulty by instead switching the discharge between electrodes by the use of externally applied magnetic fields.

SUMMARY OF THE INVENTION

The problems associated with the operation of vacuum arc devices are typically associated with the establishment of a continuous channel of low resistance ionized plasma between the electrodes of a device operating in this mode, typically accompanied by intense heating of the electrodes. Such a channel is difficult to interrupt in rapid and predictable manner once established. The pulsed abnormal glow discharge regime is characterized by no such continuous channel having been established, and predominantly cold-cathode auto-electronic emission rather than thermionic emission, these characteristics provide the ability to extinguish the discharge readily.

We have found that, by suitable design of a low pressure gas discharge tube, we can sufficiently inhibit transition from the abnormal glow discharge regime into the vacuum arc discharge regime that we can successfully exploit characteristics of the abnormal glow discharge regime to provide a device having valuable and controllable characteristics as a high power, pulse generator when fed from a current source. Such a pulse generator has useful applications in for example motor control and other applications requiring high current pulses. It is a valuable characteristic that the pulse repetition frequency can be varied over a range, the extent of which itself varies according to the physical characteristics of the tube and the environment in which it is operated. According to circumstances, the frequency may range as low as 10 pulses per second or range as high as $10^4$ pulses, these figures being exemplary only and not limitative.

The purpose of the present invention is to provide a means to operate alternating current machines, and in particular to derive useful electromechanical work from any vacuum discharge tube capable of sustaining a stable pulsed abnormal glow discharge (PAGD). The present invention provides a simple circuit having at least two parallel arms: a pulse generator arm containing the vacuum discharge and an electromechanical arm which transduces electrical pulses into mechanical energy. In the latter, the electromechanical device is integrated into a reactive load presenting a capacitance in parallel with the tube. The present invention was specially devised to work with specific cold cathode vacuum tube pulse generators as disclosed in the parent application, using either diode or triode connections, but the circuitry can be made to work with any suitable vacuum device capable of being operated in an endogenous pulsed abnormal glow discharge regime under cold cathode conditions.

The advantage of using a spontaneous emission self-pulsing device such as that described in the parent application lies in the fact that the speed of an AC motor and its torque can be varied directly by altering any of the parameters that affect pulse frequency as described in that application. Two of these parameters, parallel capacitance and applied, constant direct current, are of particular usefulness, since when all other parameters are the same, the rate of pulsed abnormal glow discharge, controlling motor speed and torque, can be made to vary as a function of increasing current applied to the cold cathode device, for any given discharge capacitance employed. This yields an extremely simple method of motor speed control, particularly suited to drive synchronous and induction AC motors from a starting DC supply, but also generally applicable to any motor, whether rotary or linear, whose speed or rate is dependent upon the frequency of a pulsed or alternating current. Rather than placing an alternating current machine directly in the circuit containing the discharge tube, it may be connected indirectly through a transformer or synchro-transmitter system.

SHORT DESCRIPTION OF THE DRAWINGS

Figure 1:
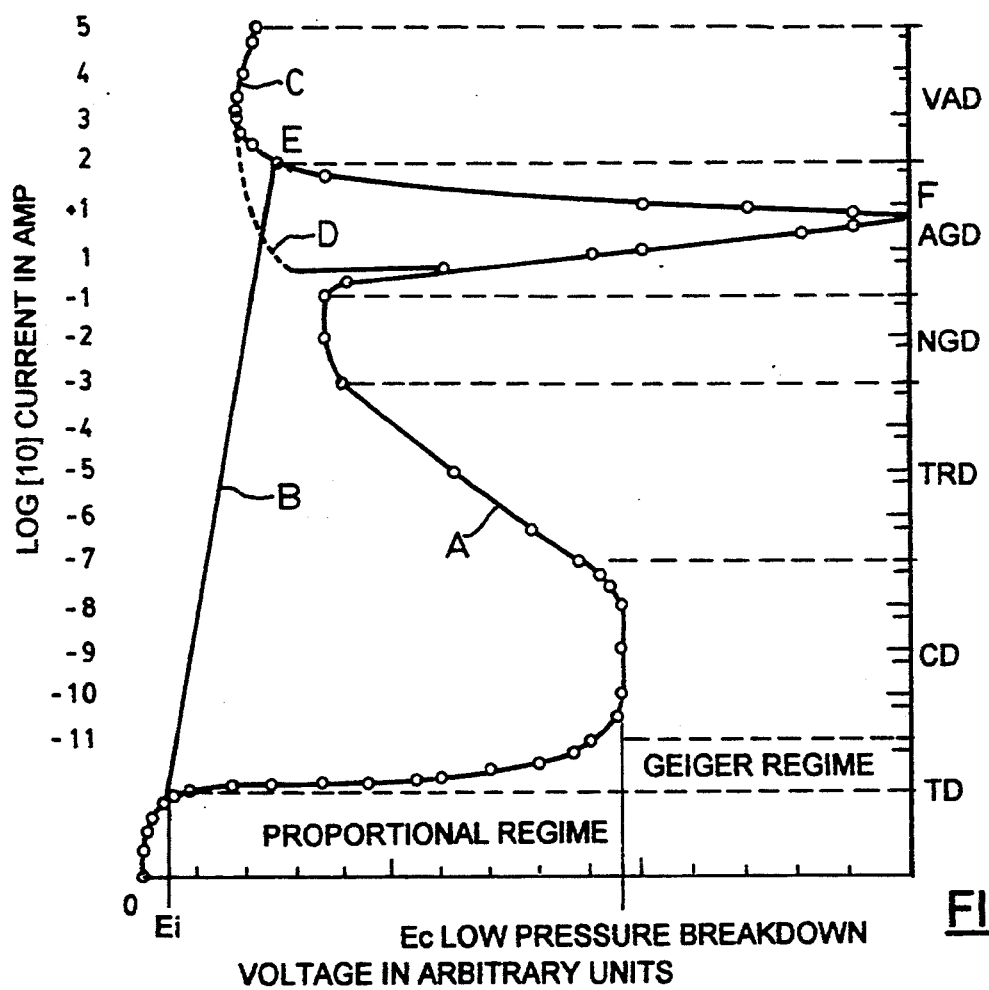
FIG. 1 is a graph illustrating the current to voltage relationship exhibited by a notional vacuum discharge tube.
Figure 3:
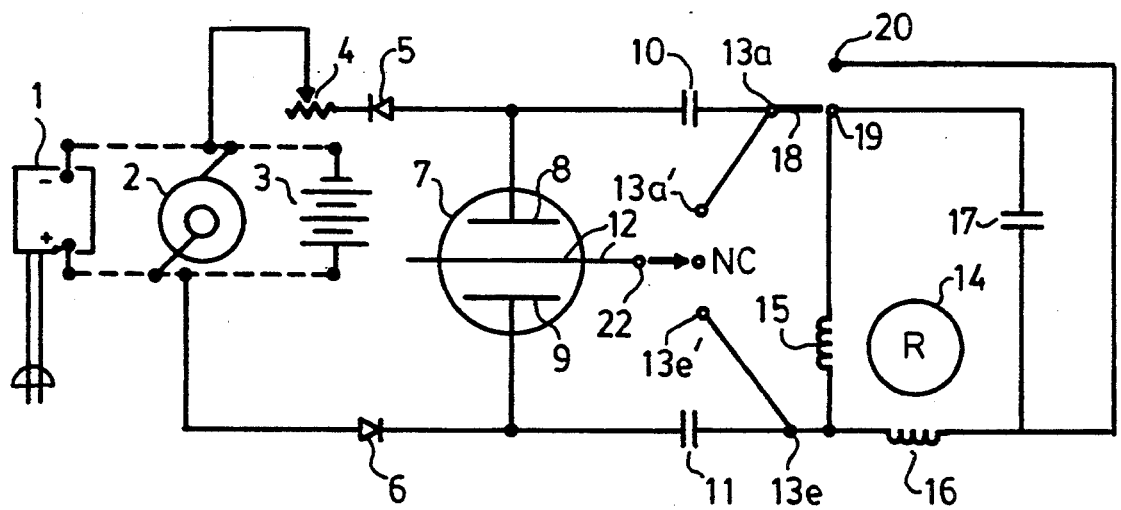
FIG. 3 is a circuit diagram of a first embodiment of the invention, using a single phase permanent-split induction or synchronous capacitor motor connected in parallel with a pulse generator using a vacuum discharge tube configured either as a diode or as a triode.
Figure 9:
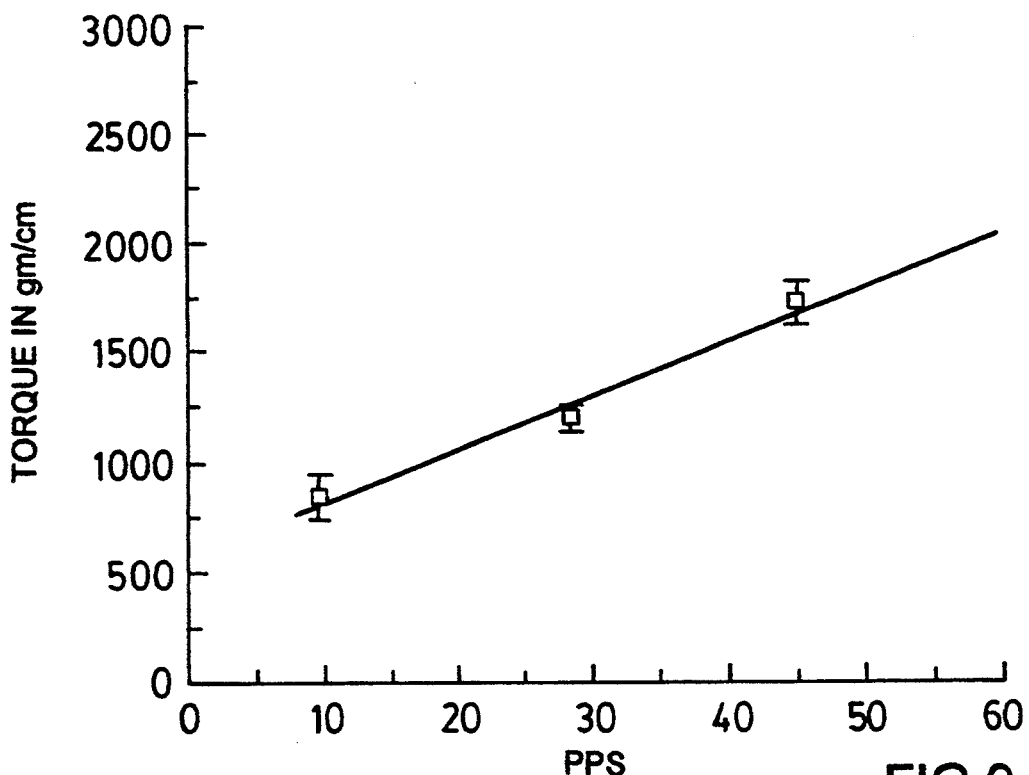
FIG. 9 is a graph showing the rotor blocked torque, measured by a rope and pulley method, of a single phase, synchronous hysteresis capacitor motor in the circuit of FIG. 3, as a function of the increasing direct current input resulting in increased pulse rate.
Figure 10:
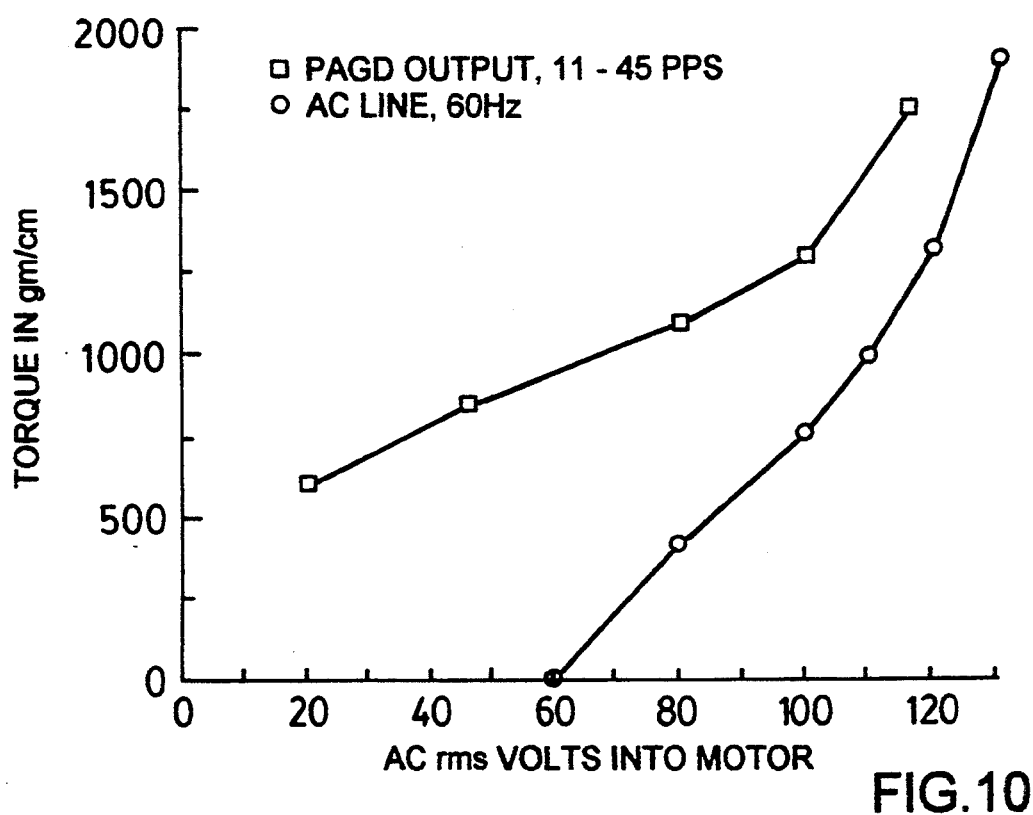
Figure 11:
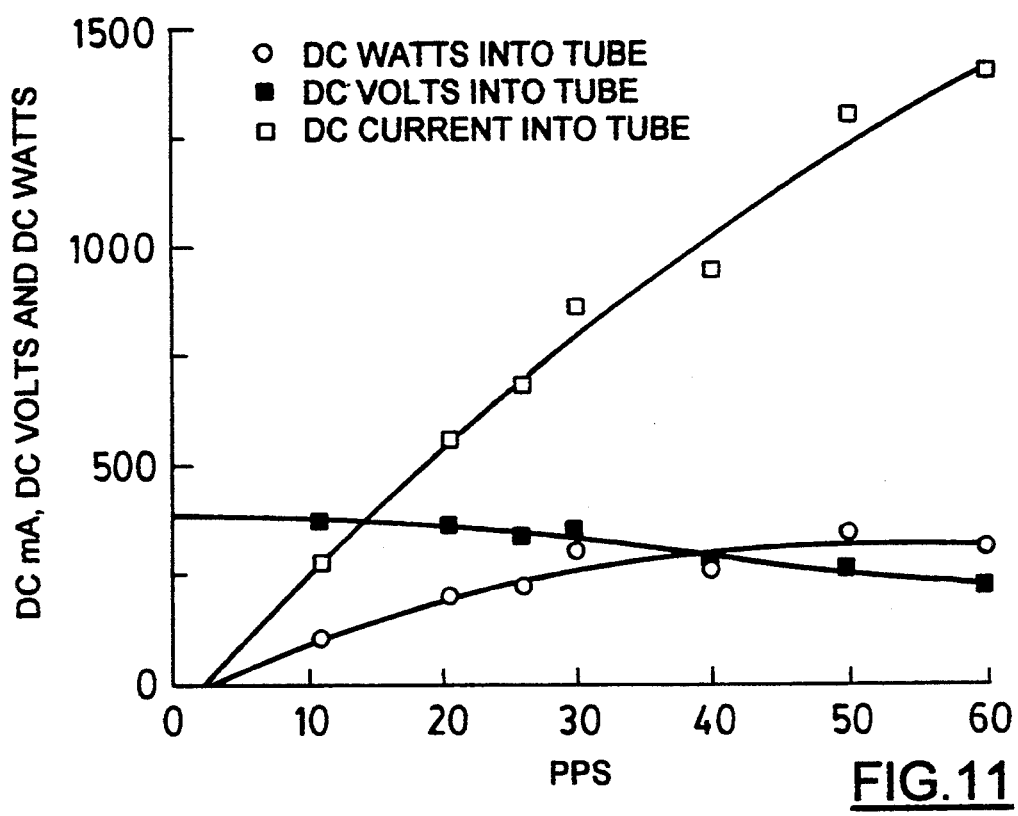
Figure 12:
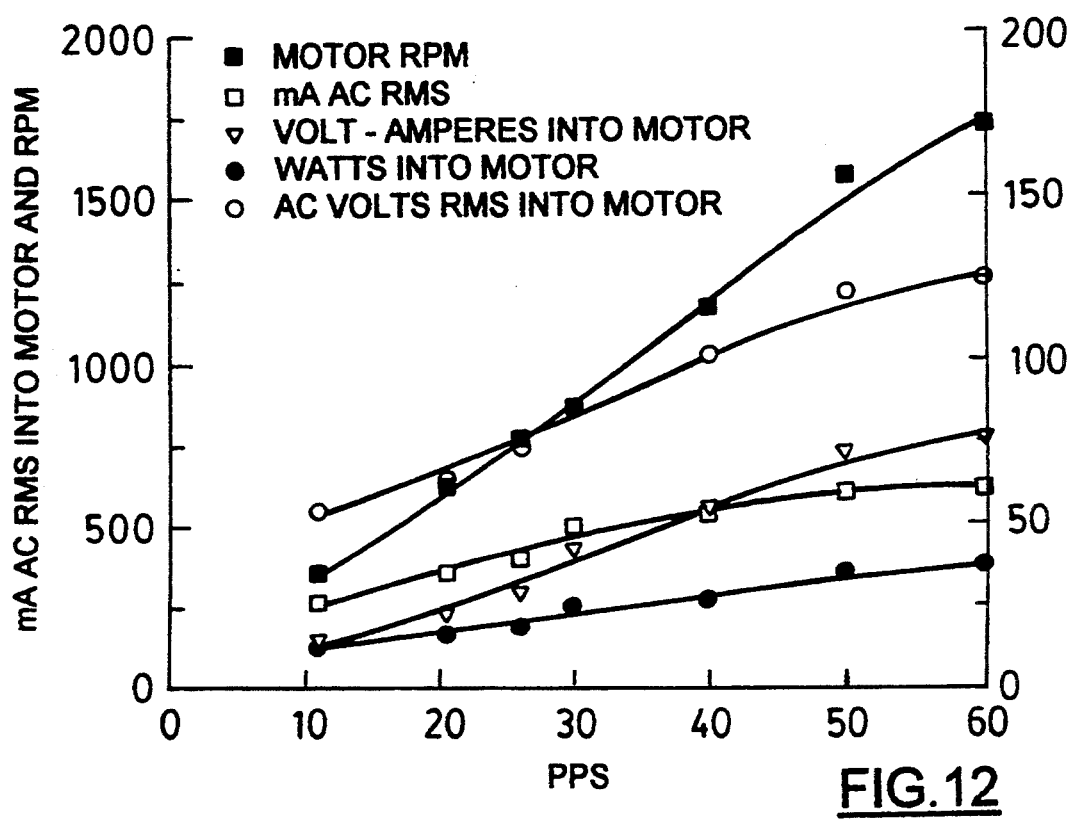
Figure 13:
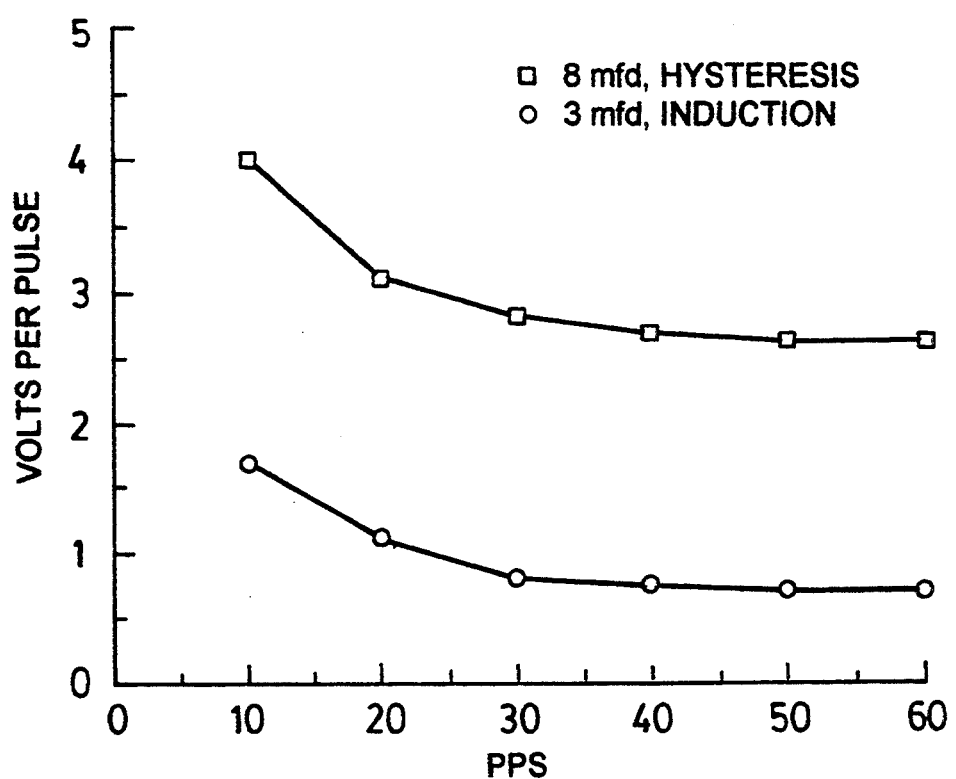
Figure 14:
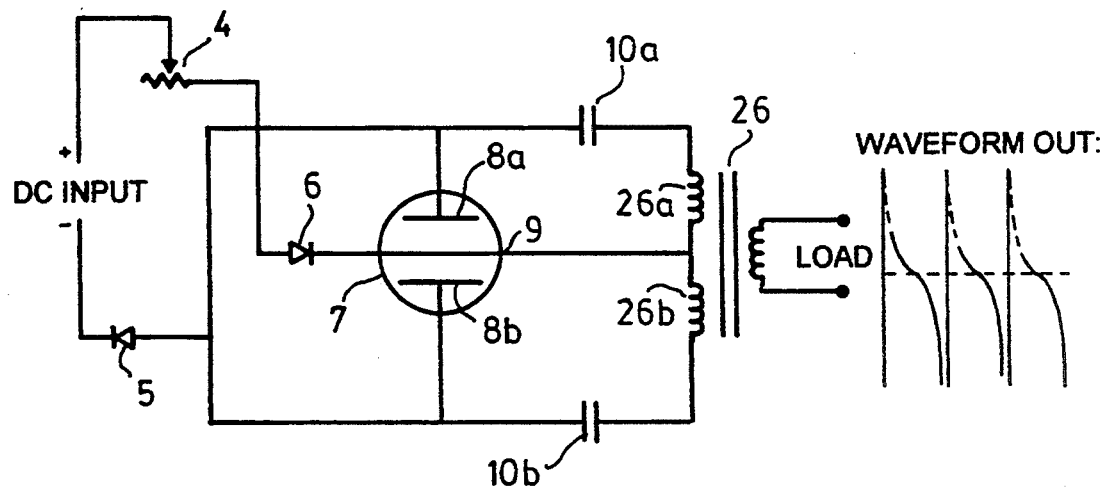
Figure 15:
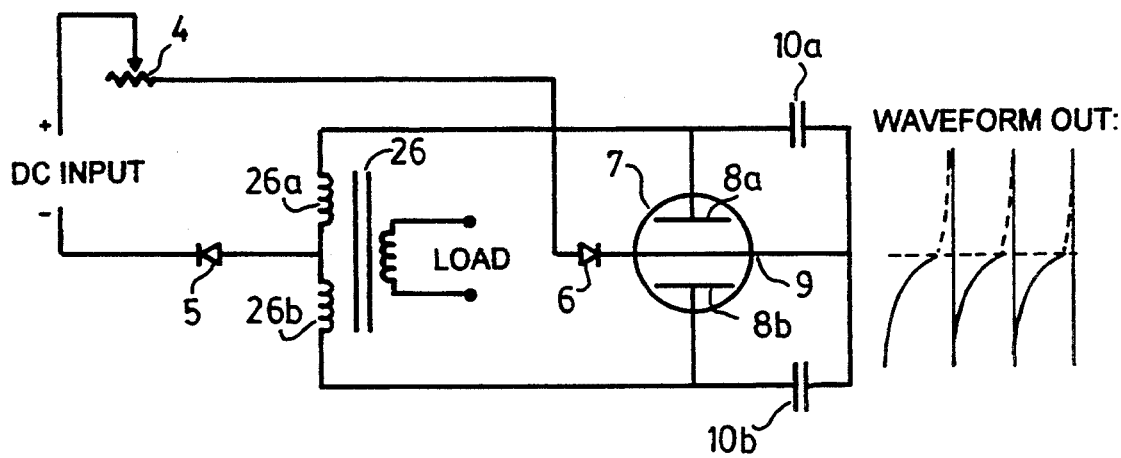
Figure 16:
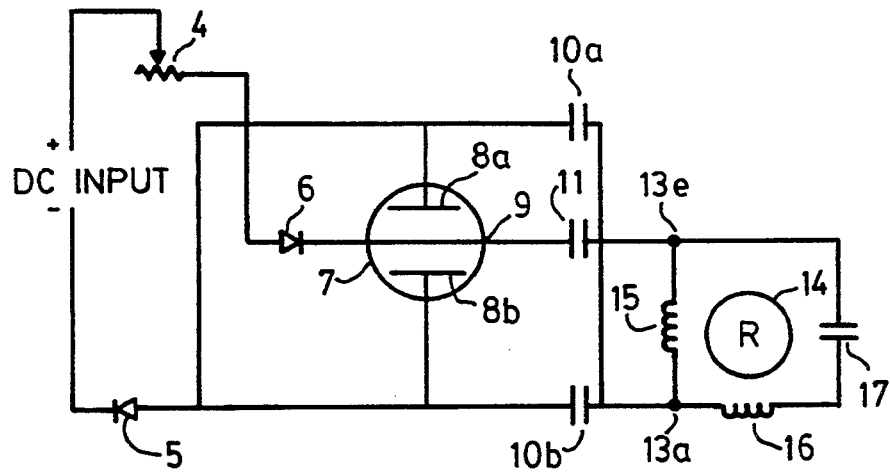
Figure 17:
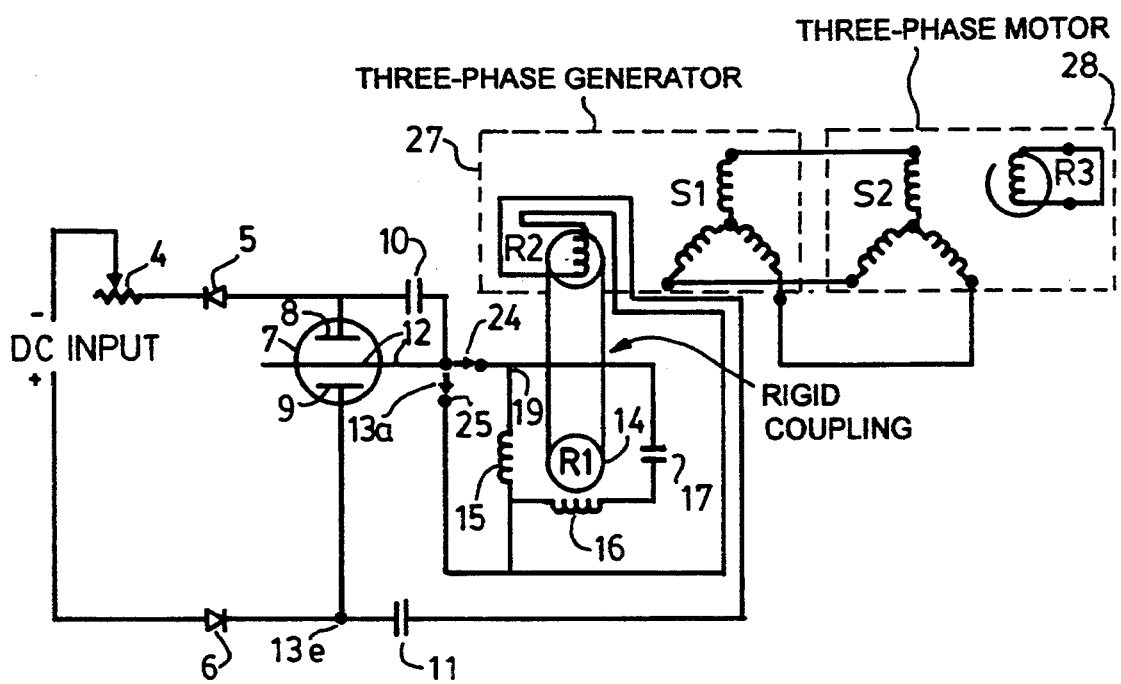

FIG. 10 is a graph showing the rotor blocked torque, measured by a rope and pulley method, of a single phase, synchronous hysteresis capacitor motor both in the circuit of FIG. 3 (as a function of increasing PAGD rate due to the increasing direct current applied to the circuit), and when run at AC line frequency of 60 Hz, torque being shown in each case as a function of the rms volts at the motor input;

FIG. 11 is a graph exemplifying how the pulse frequency of a PAGD discharge is related to direct current applied to the tube in the circuit of FIG. 1, accompanied by curves showing the potential applied to the tube and the power in watts drawn by the tube;

FIG. 12 is a graph exemplifying variation in RPM, rms current drawn, input volts, and true and apparent power (watts and volt-amperes) of a synchronous motor in the circuit of FIG. 1, and under the conditions of FIG. 9;

FIG. 13 is a graph showing the rms volts per pulse per second at various pulse rates for two different single phase capacitor motors (induction and hysteresis) utilized in the circuit of FIG. 1;

FIGS. 14 and 15 illustrate two configurations of inverter according to the invention which may be utilized to drive alternating current devices through a transformer;

FIG. 16 shows in simplified form a variant of the circuit of FIG. 3 in which the discharge tube is connected differently;

FIG. 17 shows a variant of the circuit of FIG. 3 in which the electromechanical arm is a synchro-transmission system.

Figure 18:
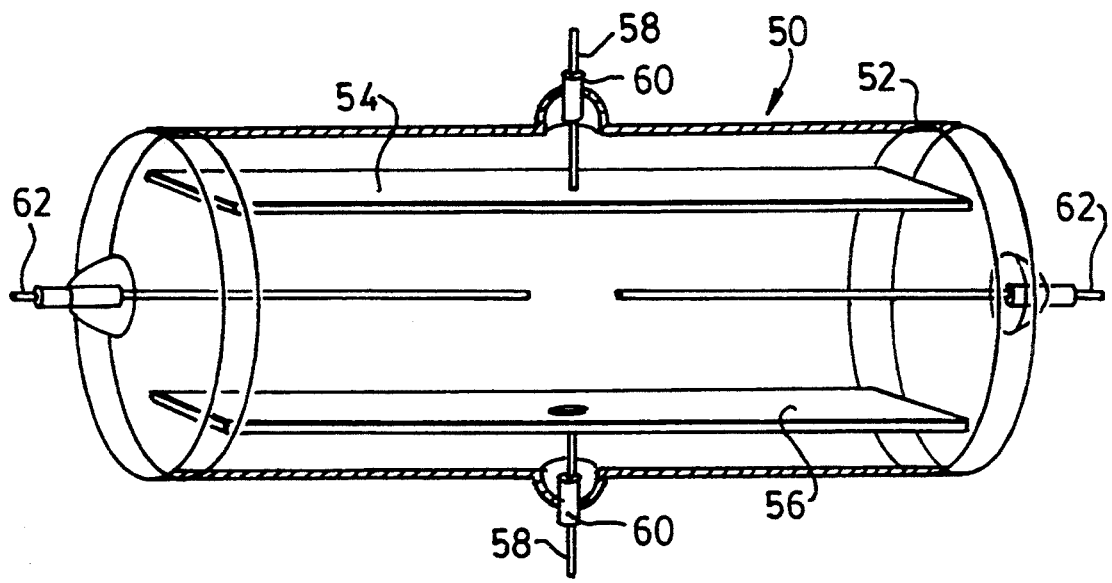
Figure 19A:
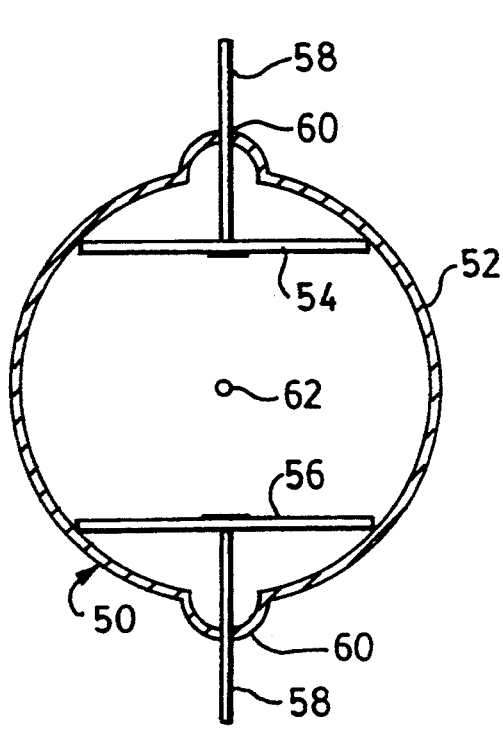
Figure 19B:
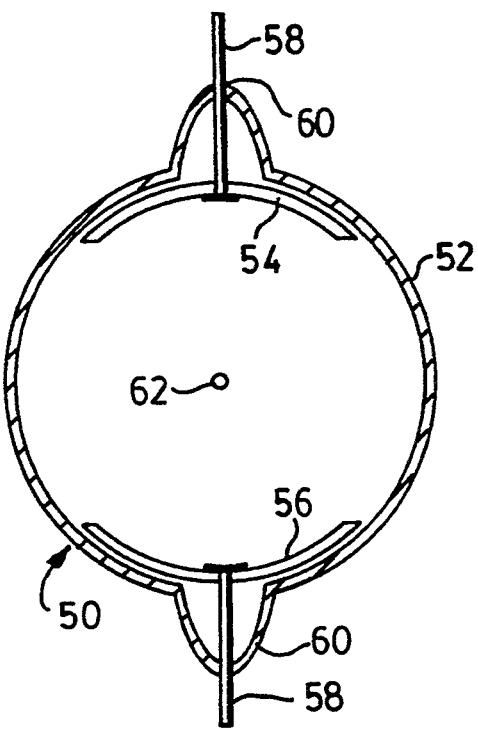
Figure 20:
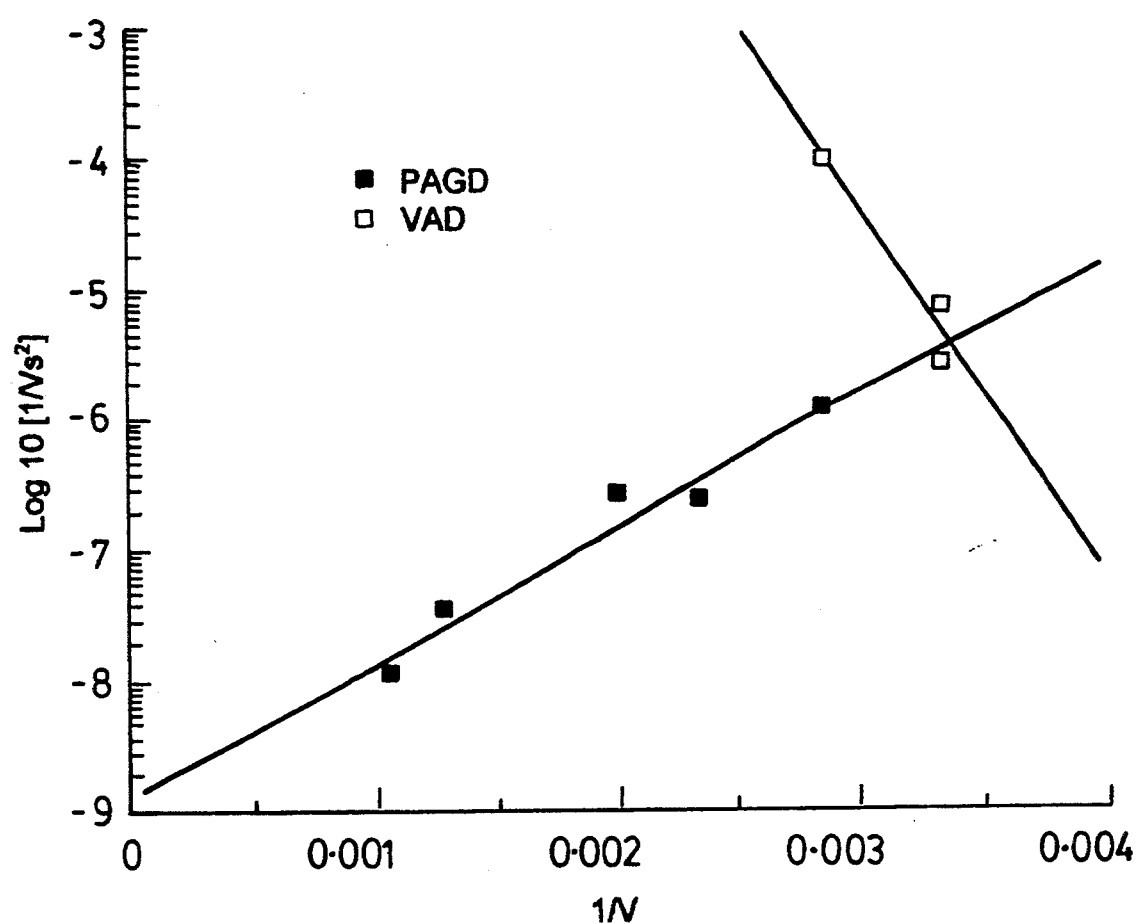
Figure 21:
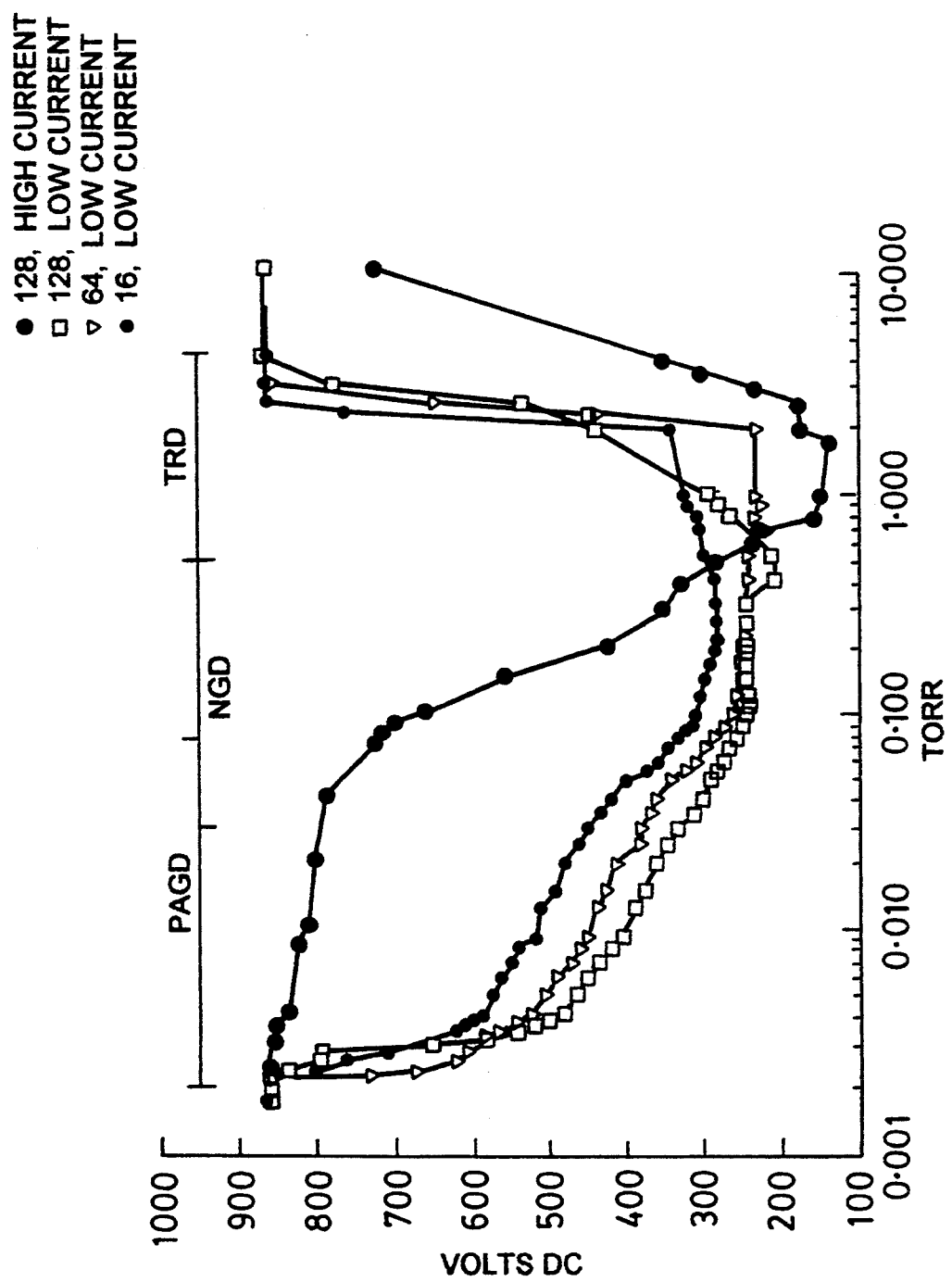
Figure 22:
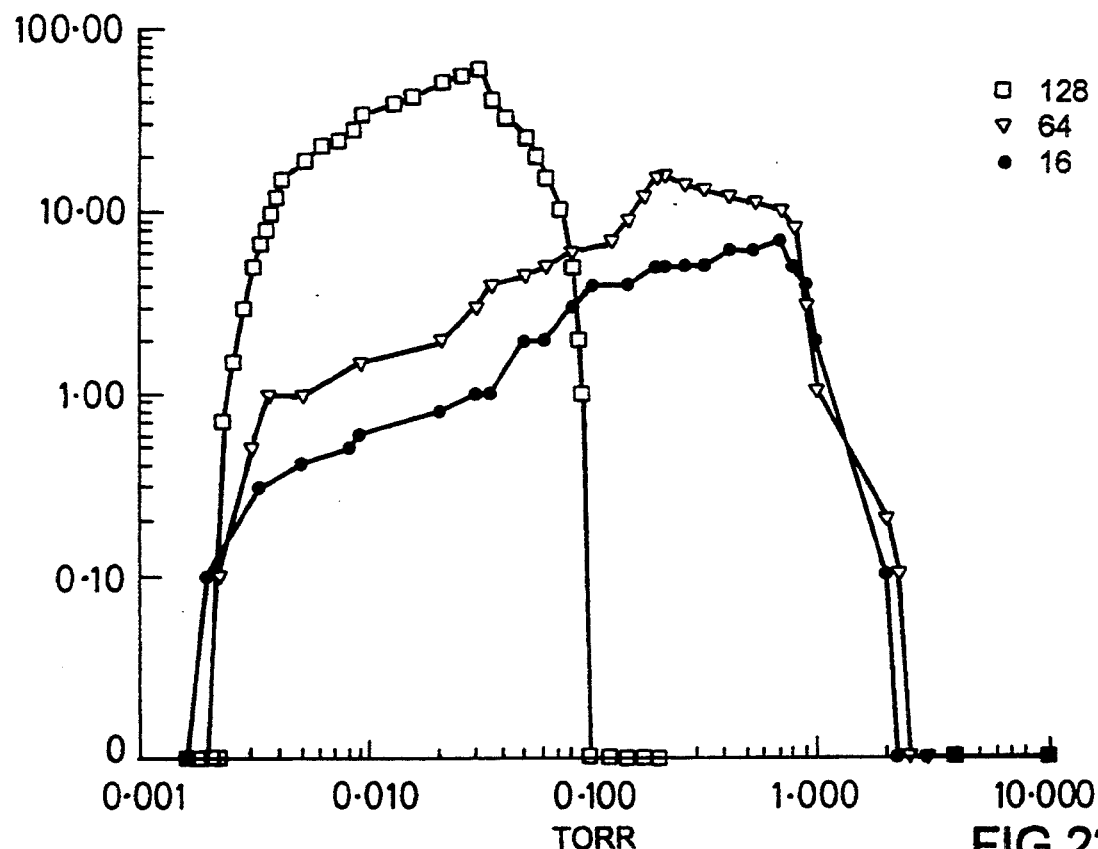
Figure 23:
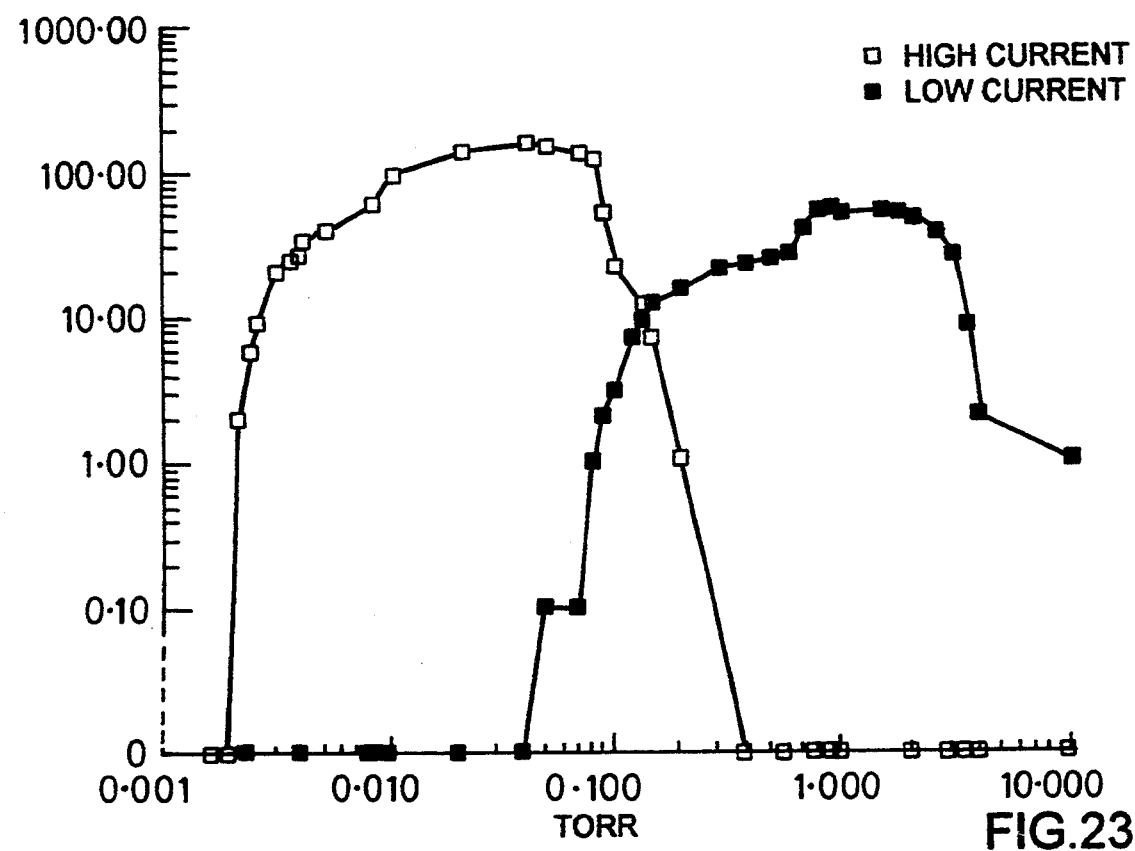
Figure 24A:
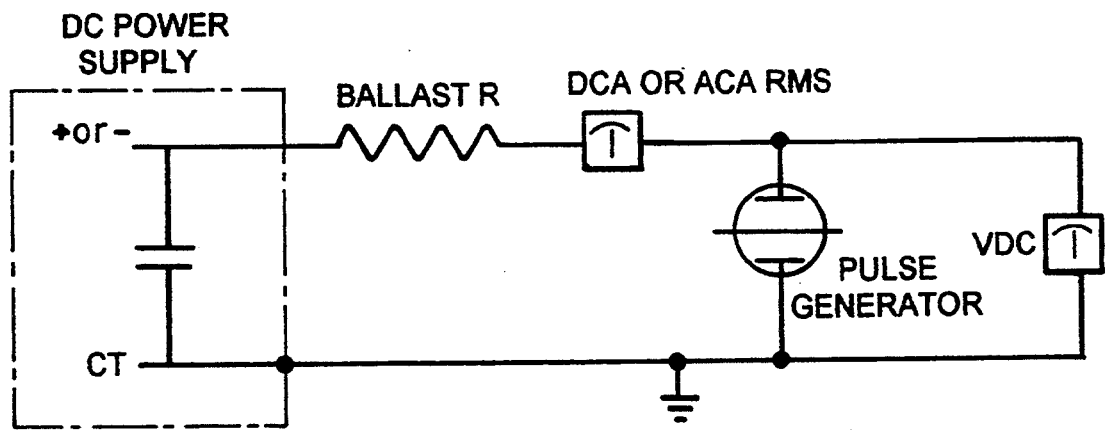
Figure 24B:
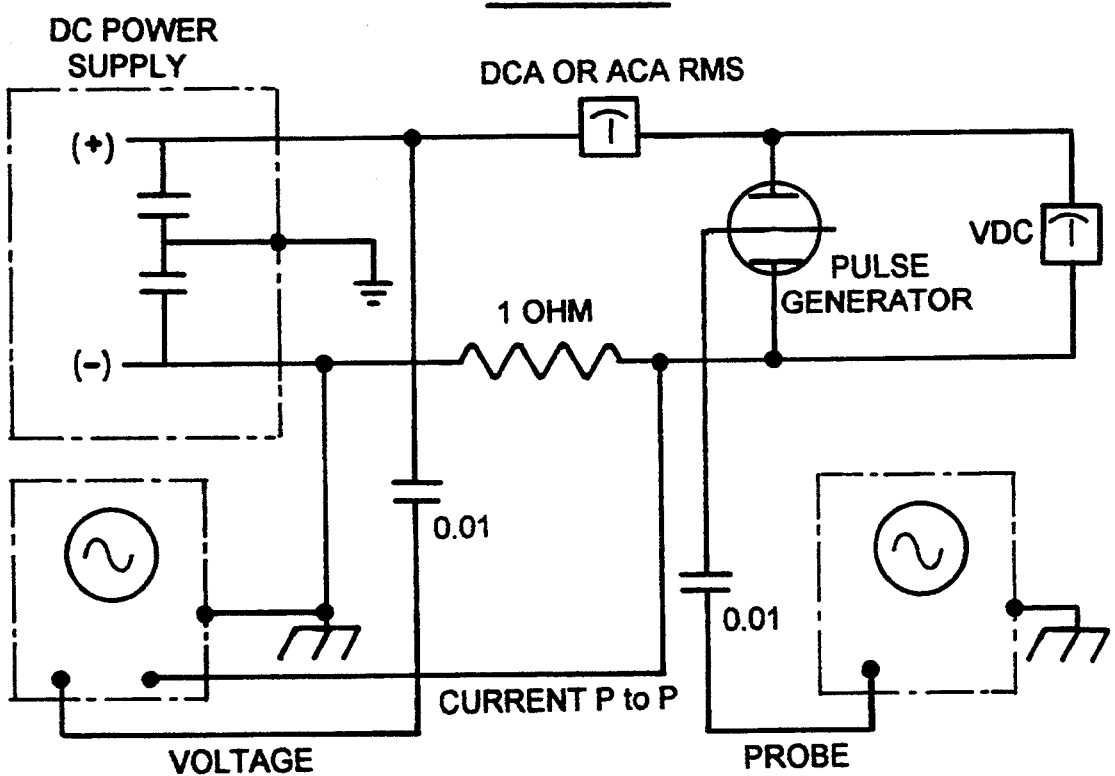

FIG. 18 illustrates a pulse generator having a glass housing and tetrode geometry;

FIGS. 19a and 19b illustrate central cross sections of the pulse generator of FIG. 18, and a modification thereof, respectively;

FIG. 20 illustrates a Fowler-Nordheim plot of the Vx or Vs values for the PAGD and VAD regimes, respectively, in a pulse generator excited with a positive-polarity constant voltage DC power supply, the PAGD and VAD values being shown respectively in closed and open squares;

FIG. 21 illustrates a continuous variation of NGD sustaining/PAGD extinction voltages (Vs/Vx), from breakdown to glow extinction, with decreasing pressure (at a rotary pump), in 4 pulse generators having different plate areas but the same electrode material (H34 aluminum), the same gap distance and the same potential of 860 VDC prior to breakdown;

FIG. 22 illustrates a continuous variation of PAGD frequency with decreasing gas pressure in 3 pulse generators having different anode and cathode plate areas (16, 64, 128 cm2) but the same cathode material (H34 aluminum) and the same gap distance of 5.5 cm;

FIG. 23 illustrates a shift of the PAGD regime to higher pressure regions during pumpdown with a rotary vacuum pump in an argon atmosphere;

FIG. 24A illustrates the circuit used in the tests that supplied data for FIGS. 2 and 20 to 23; FIG. 24B illustrates the circuit used for test results described in Example 10.

DESCRIPTION OF THE PREFERRED EMBODIMENTS

Throughout the following detailed description, the same reference numbers are used to denote identical elements present in more than one Figure.

Figure 2:
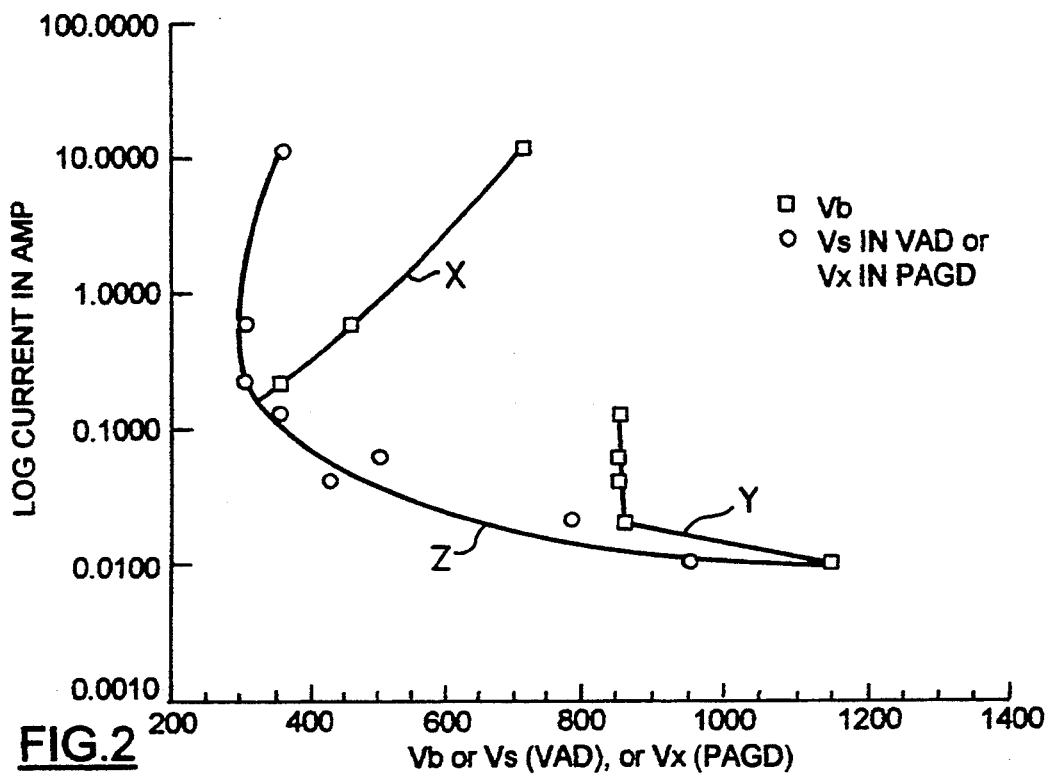
FIG. 2 is a graph illustrating the current to breakdown, extinction (PAGD) and sustaining (VAD) voltages of a particular vacuum discharge tube.

The context of the invention in terms of vacuum discharge phenomena will first be discussed with reference to FIGS. 1 and 2. Referring to FIG. 1, which plots the potential between the principal electrodes of a vacuum discharge tube with increasing current, potential being shown on a linear but arbitrary scale of voltage, and current on a logarithmic scale in amperes, curve A, below its intersection with curve B, represents a typical relationship between current and voltage for cold cathode discharges, including auto-electronic emissions, whilst curve B represents a typical relationship for thermionic glow discharges, including thermionic emissions. The high-current intersection of the two curves at point E represents a transition into the vacuum arc discharge (VAD) region (curve C) with the establishment of a continuous low resistance plasma channel between the electrodes.

It will be noted that curve A exhibits, with increasing current from very low levels, an initially rising voltage or "positive resistance" characteristic, through the Townsend discharge (TD) region, a flat characteristic through the constant discharge (CD) region, a falling voltage or "negative resistance" characteristic through the transitional region discharge (TRD) and normal glow discharge (NGD) regions, to a minimum, before once again rising to a peak of F and then falling to an even lower minimum, equal to the sustaining voltage for a vacuum arc discharge, through the abnormal glow discharge (AGD) region. The rising potential over the first portion of the AGD region is believed occasioned by saturation of the electrodes by the glow discharge, which causes the potential to rise until autoelectronic emission sets in allowing the potential to fall again as the current rises further. In practice, the increasing inter-electrode potential following saturation, and other factors such as electrode heating, leading to thermionic emission, will tend in conventional tubes to result in a premature transition from the AGD into the VAD regime, following a curve similar to curve D shown in FIG. 1.

The present invention relies on the use of gas discharge tubes designed to avoid premature transition from the AGD to the VAD regimes, and capable of being operated in a stable manner in that region of the characteristic curve of FIG. 1 extending between points E and F. Referring now to FIG. 2, which plots test results for just such a tube, constructed as described below with reference to FIG. 18 and 19, and shows, again on similar coordinates to FIG. 1 (except that the potential units are defined), the extinction or sustaining potentials of the tube (the same information as plotted in FIG. 1), together with the breakdown potential (i.e. the potential required to initiate the autoelectronic discharge). It will be noted that the breakdown curve shows two discontinuous portions X and Y, corresponding to the vacuum arc and abnormal glow discharge regimes respectively. The intersection of curve X, and curve Z representing the sustaining or extinction potential is illustrative of the difficulties inherent in extinguishing a vacuum arc discharge, since a decrease in current is accompanied by a decrease in breakdown voltage until it equals the VAD sustaining voltage which does not vary greatly in this region. On the other hand, the combination of a fairly high and constant breakdown voltage (curve Y) combined with an extinction potential which rises with decreasing current in the region E–F (see FIG. 1) of the pulsed abnormal glow discharge regime means that the pulsed abnormal glow discharge will be extinguished if the current source during the tube operation ceases to be able to sustain the increasing current required to maintain the discharge as the potential between its electrodes drops, at some current below the intersection of curves X and Z.

If the effective internal resistance of the source is above some critical level, then as the current through the tube rises, the proportion of the source potential developed across the tube will fall until it intersects the curve Z at a current below the intersection with curve X, at which point the abnormal glow discharge will self extinguish, and the current flow through the tube will drop abruptly until the current through the tube combined with the potential between its electrodes again intersects the curve A in FIG. 1. This permits reestablishment of a rising current through the tube traversing the abnormal glow discharge region as the potential across the tube rises to the peak F and then again falls to a point short of E. Accordingly, under these circumstances, a pulsed abnormal glow discharge will be exhibited, accompanied by high amplitude current pulses through the tube. It should be understood that the curves of FIG. 1 are indicative of the static behaviour of a nominal discharge tube under particular current and voltage conditions, and are not fully indicative of the behaviour of the tube under dynamic conditions in which tube current and inter-electrode potential vary with time, nor with changes of the many other factors which may influence tube behaviour. In particular, the plasma effects generated in various phases of tube operation require finite time to form, reform or dissipate as the case may be, and in the case presently under consideration this time factor, combined with time constants of the external circuit in which the tube is placed, are determinative of the pulse frequency of the discharge.

The definition of any regime of electrical discharge in a vacuum is usually presented as dependent upon the major operational parameter being considered, i.e. upon the variation of direct current passing between the primary electrodes. For a given optimal vacuum (which must necessarily be less than perfect) all gas electrical discharge regimes can be presented as dependent upon this parameter. FIG. 1 is such a presentation and the peak that characterizes the abnormal discharge region means that within this region, as the applied current is increased linearly, the resistance of the vacuous medium in the tube first increases with increasing current, only to subsequently decrease, still with increasing applied current, down to the minimum resistance value corresponding to the sustaining potential of a "vacuum" arc (which is somewhat above the ionization potential of the gas, or in fact of the metal vapour, in the enclosure). As the transition from a normal glow discharge into a vacuum arc discharge is made either directly (in thermionic devices) or indirectly, in cold-cathode conditions, via an abnormal glow discharge that may be more or less precipitous, it is only in the ideal diode and the ideal vacuum that both linear functions (corresponding to the regimes that have a sustaining potential) and nonlinear functions (corresponding to the transition regions, such as the TRD and the AGD) appear to depend exclusively upon the input current. In fact, many factors affect the AGD, foremost amongst them, pressure, plate distance and plate area. Hence the peak in the curve of FIG. 1 is an idealized view of events.

This said, we are left with the experimental observations and what they tell us. In this respect, auto-electronic emissions characteristic of the pulsed abnormal gas discharge (PAGD) regime can be seen to emerge from the NGD, as the current is increased beyond the point when the cathode glow has reached plate saturation (if the current is not too low and the plate area not too large).

The same effect occurs when the pressure is reduced and the current is kept constant at a suitable level (neither too high nor too low, exact figures depending on other factors such as gap distance and plate area, etc.).

If the current is increased further, in either case, the PAGD regime fully emerges (in other words, in pump-down tests, the applied current also has to be sufficient). In this regime the plate is not so much saturated with a negative glow (which remains, but is attenuated), but exhibits local concentrations of the plasma that arise in a given area of the cathode as a function of the auto-electronic emission mechanism. If the applied current is increased in steps, a stage is reached at which the extinction potential of the PAGD falls until it meets the minimum potential of an arc discharge, as demonstrated in FIG. 2. With reference to FIG. 1, this means that the current-dependent variation of the PAGD in these devices passes from a high to a low extinction potential or from a high to a low electrical resistivity of the medium, and is thus localized on the descending slope of the peak in FIG. 1. Expressed in terms of resistance characteristics, the regime of the pulsed abnormal glow discharge spans, as a function of applied current, a subregion in which a positive resistance characteristic changes into a leading negative resistance characteristic. The pulsed regime of the AGD is only sustainable when the intensity of the applied current is greater than that needed to rapidly saturate the plates (but not so great as to set up VAD), the result being development of auto-electronic emission with its associated inverted cone-like discharge and a residual, faint glow of the entire cathode (rather than a saturated NGD).

Each PAGD cycle begins as a singular emission and performs a cycle of functions whose electrical characteristics vary accordingly with time. During a charging process (which eventually leads to emission), the plate potential rises to a maximum at F (see FIG. 1), while being limited by the maximum virtual value of the applied current. Any substantial increase in the applied current is blocked by the insulating properties of the intervening medium (as if a very large resistance characterized the device); in the discharge process, beginning with the initiation of auto-electronic emission at F, conditions for conduction across the (operational) vacuum are established and, as a consequence, the resistance characteristic of the device becomes increasingly negative until the extinction potential is reached, at which point the glow discharge ceases. This endogenous on/off behaviour is exactly what characterizes the PAGD cycle.

Two boundary conditions arise. In the first case, the available current is not quite enough to sustain the PAGD. In this instance, full escape from the NGD regime and the characteristics associated with its sustaining potential will not occur, while any heating of the cathode will eventually lead to the establishment of a semi-thermionic cathode glow. In the second instance, there is a risk of degeneration into a thermionic NGD or a VAD if the available current is too high or sustained too long. This degeneration will set in during the second phase of the PAGD unit cycle, and may lower the resistance of the device to the point of constant conduction of current across the vacuum; the result is that the auto-electronic emission is not quenched, as spontaneously happens in the PAGD. Thereafter, extinction of the resulting VAD, which may be promoted by a variety of factors is an unpredictable event; if the current is available, the arc will burn for as long as there is energy supplied and as long as there is cathode material available to consume. A VAD in no way resembles a regular, cyclic oscillator, which is the outstanding aspect of the PAGD. Whilst an arc discharge is, like the PAGD, an auto-electronic emission phenomenon characterized by intermittences (the apparent constancy of an arc is the result of the high frequency of these intermittences), such an arc does not exhibit the regular or quasi-regular cyclical nature of the PAGD, nor its inherent current limiting characteristics.

In order that a stable pulsed abnormal glow discharge (PAGD) as discussed above may be obtained, the discharge to be utilized must be capable of repeated excursions into the region E to F of FIG. 1. This entails that the tube be constructed so that, as the tube operates and the current through it rises, the potential across the tube can reach the peak F in FIG. 1 and beyond, without the abnormal glow discharge degenerating into a vacuum arc discharge. This will be influenced, among other factors, by the extent of thermionic emission from the cathode which will itself be influenced by resistive heating of the electrodes and their work function, as well as by their separation and configuration, and the nature and pressure of gas within the tube, as well as the presence of auxiliary electrodes or probes. The influence of these various factors is extensively exemplified below, with reference to the description associated with FIGS. 18 to 24b, which description; discloses tubes capable of sustaining PAGD. Whilst the present invention is described with reference to its use in connection with such tubes, it should be understood that the invention may be implemented utilizing any tube capable of sustaining a stable PAGD discharge whether or not disclosed in our earlier application.

FIG. 3 shows a first exemplary embodiment of the invention operating in the examples described with a single phase permanent-split induction or synchronous capacitor motor having a rotor R, stator windings 15 and 16, and a capacitor 17. The motor is connected to terminals 13a and 13e and via capacitors 10 and 11 to the electrodes of a vacuum discharge tube 7, capable of producing cold cathode abnormal glow plasma pulses and constructed in accordance with the principles set forth in FIG. 18 to 24b and their associated description. Motors with other characteristics, such as single phase capacitor-start induction motors, two-value (start and run) capacitor induction motors, repulsion-induction motors, repulsion-start induction-run motors, reluctance motors, universal motors, split phase motors, two-phase induction or synchronous motors (wired as single phase capacitor-run motors), or single phase rotor input synchro-transformer generators could also be connected to the same terminals 13a and 13a.

As shown in FIG. 3, the voltage source may be either a line-fed DC power supply 1 (preferably constant current), a DC generator 2 or a battery pack 3. For best results, one of the latter two should be employed because line-fed supplies will contain other parallel circuitry, including an internal bypass capacitance and, unless they are very well regulated, will leak alternating current from the line which may influence the pulse rate or stability of the PAGD discharge. The supply voltage and current may be controlled by using methods known to those skilled in the art, whichever source is used. With line fed power supplies it is preferred to control the DC output by varying the power input using the autotransformer method. With a DC generator, the power output can be controlled directly by varying the speed of the generator. With a battery, simple control of input direct current and output pulse frequency from vacuum device 7 is best achieved with a variable series resistor 4. Diodes 5 and 6 prevent transients from the pulse discharge from reaching the DC source.

The discharge tube 7 is shown in FIG. 3 connected in a diode configuration with cathode 8 placed between rectifier 5 and capacitor 10 and the anode 9 placed between rectifier 6 and capacitor 11, by virtue of a switch 22 being turned off (position NC). When switch 22 is turned to position 13a' so that an axial member or probe 12 within the tube is connected to the terminal 13a, the pulse frequency increases by an amount depending on the parameters of the circuit as a whole. In this configuration, the axial member of the pulse generator functions as a plasma excitor member, as it lowers the potential and increases the rate of discharge by adding its spontaneous emissions to those of the cathode. The same result obtains when switch 22 connects axial member 12 to position 13e' instead, thus joining it to terminal 13e.

The capacitors 10 and 11 are placed in parallel with the reactive electrodes, with the motor 14 in series between capacitors 10 and 11, but in parallel with either the plates (diode configuration) or the axial member and the cathode or anode (triode configurations) as the case may be. For best results, it is desirable to have capacitances 10 and 11 disposed symmetrically in the circuit as shown in FIG. 3. An unbalanced circuit results when one capacitor is absent, and anode counter-emissions become frequent. Capacitance values for discharge capacitors 10 and 11 are determined as a function of the type of vacuum pulse device employed and the nature and performance characteristics of the AC motor 14 chosen. If the capacitances are too small, the motor will not start nor maintain rotation; if too large, the motor will not turn smoothly or continuously, and spontaneous anode counter-emissions may occur which will break the rotation of the motor by reversing the direction of the electromagnetic flux. The critical parameter is the total series value of the capacitance placed in parallel with the pulse generating device, and there is no need for the capacitances 10 and 11 to be identical; in fact it is preferred that there be a higher capacitance on the side of the cathode (capacitance 10) than on the anode side (capacitance 11) when the triode configuration has the axial excitor member connected to 13a via switch 22 at position 13a', or the reverse when the axial member is connected to 13e.

The AC motor employed may, in general, be of any type. Split phase, single phase, or two phase AC motors, be they universal, induction or synchronous types, having squirrel-cage, wound-type, eddy current, drag cup or hysteresis-type rotors, will all respond to the pulses generated in this circuit. Single phase, permanent-split capacitor, AC induction motors having squirrel-cage rotors and single phase AC synchronous hysteresis capacitor motors are preferred. The latter, in particular, have the advantage of developing a nearly uniform torque from stationary or blocked rotor positions to synchronous speed as well as producing a smoother response to the pulsating nature of single phase power (e.g. in a 60 Hz circuit, power is in fact delivered in pulses at 120 Hz) than that of other single phase motors. The motor 14 in FIG. 3 has its main winding coil 15 in parallel with the discharge tube and an auxiliary coil 16 connected in parallel with the main coil 15 via the phase capacitor 17. This corresponds to the connection as a single phase AC permanent-split capacitor motor. To reverse the direction of the motor it is sufficient to switch the position of switch 18 from pole 19 to pole 20. If motor 14 were a suitable two phase AC induction or synchronous motor wired as a permanent-split capacitor single phase motor, then the reversal obtained by switching 18 would provide an equal torque in either direction of rotor rotation of the motor. A less efficient start-up or phase displacement utilizes a resistance in place of capacitor 17, in a manner known in the art. The resistance may be varied to alter the motor speed.

Replacement of pulse generator 7 by a suitable vacuum device, as diverse as a fluorescent light bulb (as a diode) or a deuterium triode indicates that, despite the absence of desirable physical parameters identified in the parent application, any cold cathode operated vacuum tube device capable of endogenous pulsed abnormal glow discharges through spontaneous autoelectronic cathode emissions when operated in the abnormal glow discharge region, is capable of serving as the pulse-forming discharge tube in the circuit. By contrast, whilst discharge tubes operating in the normal glow discharge region can be used to form pulse generators, the mechanism is different and the power output would generally be too low to be useful in an electromechanical application.

Any inductive AC electromechanical device such as a relay solenoid or linear motor, may also be employed in place of motor 14 at terminals 13a and 13e, FIG. 3, to derive electromechanical work from the on and off switching action of the vacuum discharge tube 7 when operated in the abnormal glow discharge region.

An advantage of the invention is that a constant current supply coupled to a suitable vacuum discharge tube can be used to obtain smooth rotary action from certain AC motors in an easily controllable fashion, without having recourse to a conventional inverter system in order to produce alternating current, and provides a simple means of frequency control. Whereas the main limitation imposed on the use of induction or synchronous AC motors is that they are essentially constant speed motors which can only vary their torque as a function of the magnitude of the AC voltage and current input (given that the frequency of the power supply cannot normally be changed), the present invention allows the torque and speed of an AC motor to be controlled by varying the DC voltage and current applied to any cold cathode vacuum device 7 operated in the pulsed abnormal glow discharge regime as discussed above, as well as by varying the pulse rate of the vacuum discharge by other means such as through the probe 12 in a device as described in the parent application. Furthermore, the electromechanical force is developed from a nearly even sequence of discontinuous energy bursts, of controllable frequency, rather than continuous sinusoidal power pulses at a fixed frequency.

Figure 4:
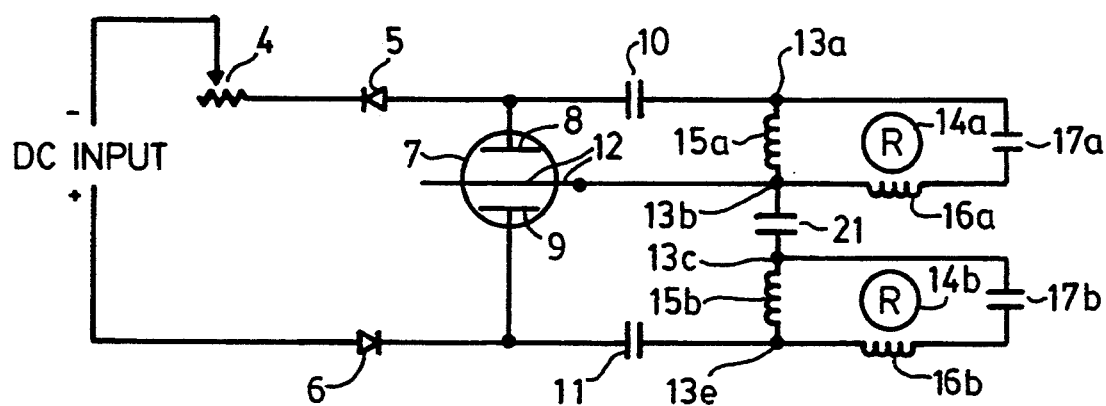
FIG. 4 is a circuit diagram of a second embodiment, employing two motors in series, and a triode connected vacuum tube pulse generator.

FIG. 4 shows how two single phase permanent-split capacitor AC motors 14a and 14b may be connected symmetrically in tandem, both placed in parallel with a single vacuum discharge tube 7, following the principles described above for FIG. 3. Independently of whether the axial member 12 is or is not connected to junction 13b, a capacitor 21 may be advantageously introduced between junctions 13b and junction 13c, to even out the rotation of the two motors, although it is not essential.

Figure 5:
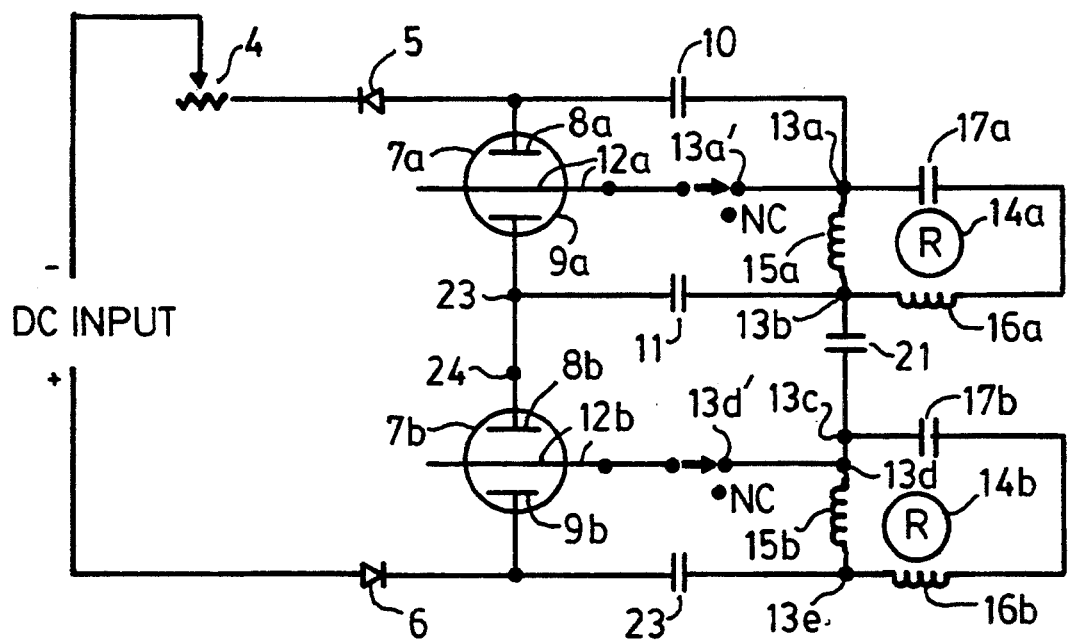
FIG. 5 is a circuit diagram of a third embodiment, employing two motors in series, and two vacuum discharge tubes placed in series.

FIG. 5 shows how two (or more) discharge tubes may be connected in series to drive two or more motors 14a and 14b also in tandem, from the output of two or more vacuum devices 7 placed in series with each other.

Figure 6:
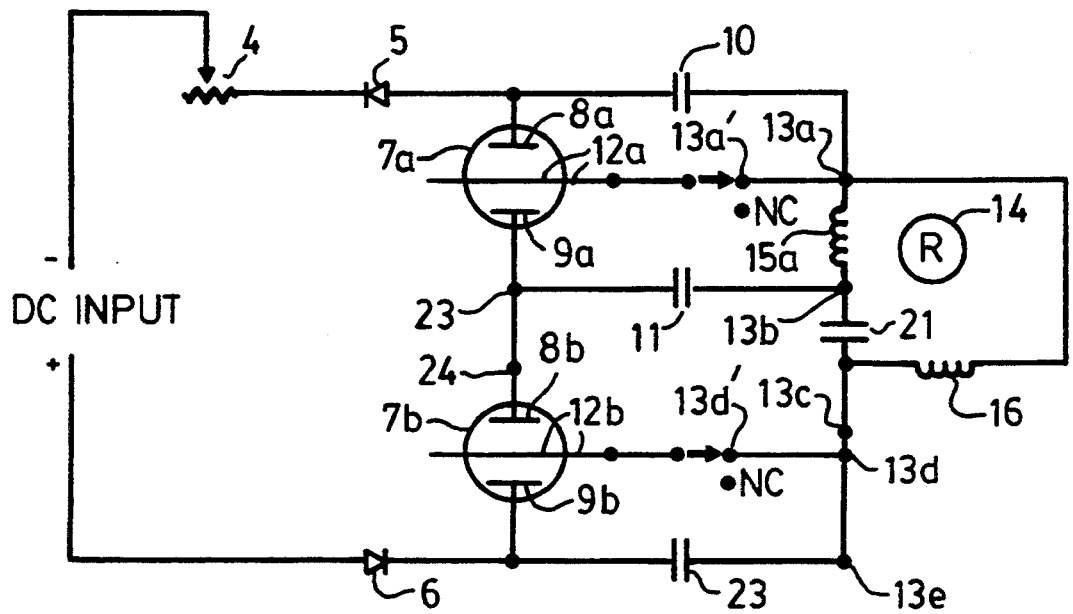
FIG. 6 is a circuit diagram of a fourth embodiment, employing a two-phase motor, and two vacuum discharge tubes placed in series.

Connections 13a' and 13d' from axial members 12a and 12b, as well as capacitor 11 and its connection to 13b may be omitted and the circuit will still function. The circuit of FIG. 5 will produce a pulse sequence at the output from the second tube which is phase shifted with respect to that of the first tube, with further shifting as more tubes are added. It is thus possible to couple multiphase motors as shown in FIG. 6, (showing a two phase motor) with a suitable capacitance 21 being introduced between junction 13b and junction 13c to control further the firing rate of the second vacuum device 7b. The addition of more tubes in series will further displace the phase of the pulse sequences in each successive device. Sufficient relative angular displacement of two tube-generated pulse sequences can also be achieved by introducing a suitable delay relay between points 23 and 24, at the cathode input to the second vacuum device.

In general, the pulse frequency developed by a discharge tube operated to produce PAGD in the circuits described will depend on several factors: some are circuit factors, such as the total discharge capacitance placed in parallel with the vacuum device, and the characteristics of the power supply (direct current and voltage values); others are physical factors, such as the pressure, the chemical nature of the gas fill and the field-emission work function of the cathode material and its composition and still others are geometrical or dimensional in nature, such as the interelectrode distance, the plate area and the parallel plate arrangement. All these factors are discussed in the parent application.

The following examples relate to tests of the circuit of FIG. 3.

EXAMPLE 1

Figure 7:
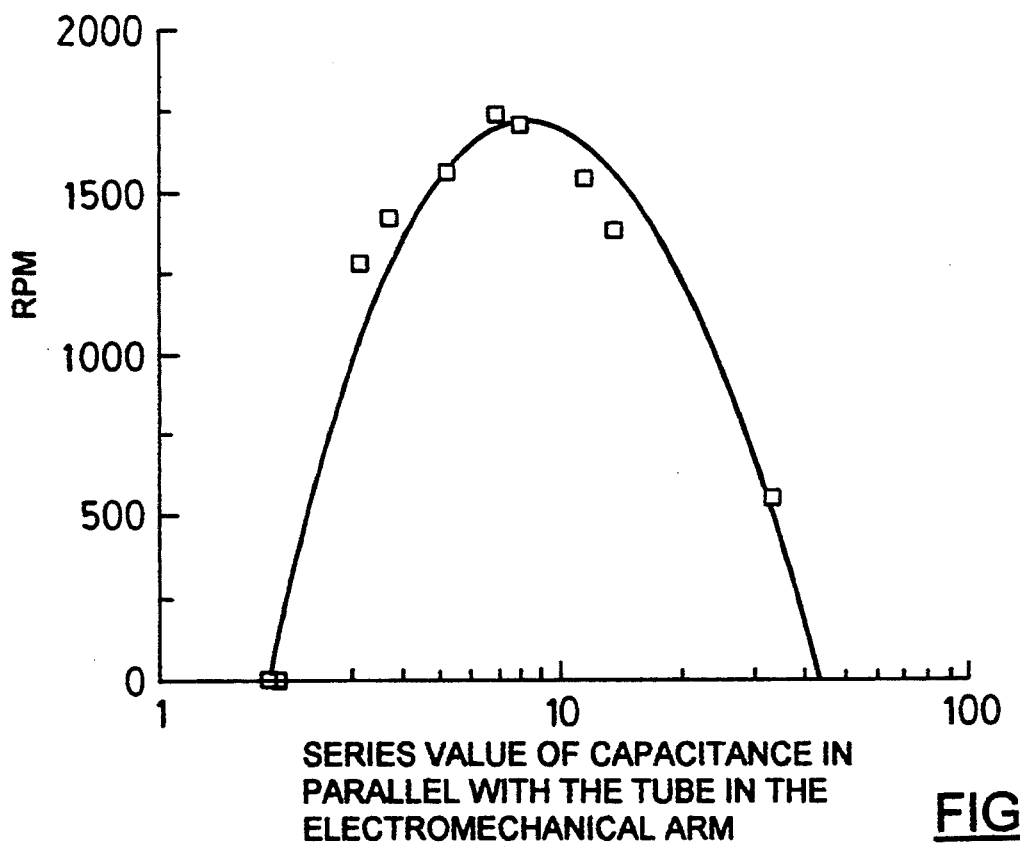
FIG. 7 is a graph illustrating the results of tests using the first embodiment of the invention, using a permanent split capacitor induction motor, showing how motor speed in RPM varies with the total series value of the external capacitance placed in parallel with the vacuum discharge tube by the electromechanical arm of the circuit.

The circuit of FIG. 3 was tested with a single phase squirrel cage induction motor, the capacitor 17 being 2 $\mu$Fd. The RPM of the rotor was measured with a stroboscopic tachometer to determine how it varied with the total series value of the external capacitances 10 and 11 (FIG. 3) placed in the electromechanical arm of the circuit, in parallel with the anode and the cathode of a discharge tube constructed as described with reference to FIG. 18, with 64 $cm^2$ plate area, 5.5 cm interelectrode distance and an air fill at 2 Torr. The tube was excited in a triode configuration (switch 22 at position 13a' and switch 18 at position 19, FIG. 3) by an AC line-fed DC power supply. The results are shown in FIG. 7. Provided that the capacitance is not too high or too low, other factors such as the frequency of the pulses generated by the vacuum device (which increases with decreasing parallel capacitance) and the type and characteristics of the windings and of the rotor of the motor employed, have a greater influence on the motor speed.

EXAMPLE 2

Figure 8:
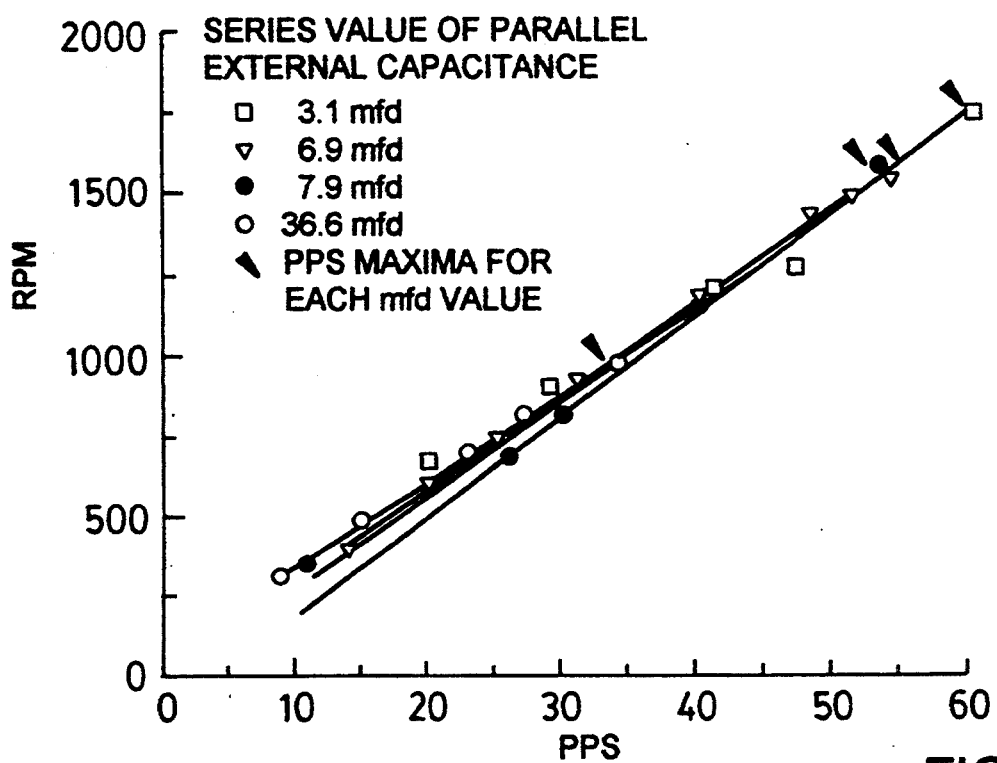
FIG. 8 is a graph illustrating the synchronous RPM vs. pulses per second linear response, in the circuit of FIG. 3, of a single phase, synchronous hysteresis capacitor motor for four different series capacitance values in the electromechanical arm of the circuit and the maximum pulse rates obtained for each combination.

The total value (internal to the power supply and external to it) of the capacitance placed in parallel with the discharge tube in the same triode configuration of the previous Example, in turn affects the maximum frequency of abnormal glow discharge pulses produced, and the effective synchronous motor RPM, as shown in FIG. 8. This figure presents motor RPM as a function of the total series value of the external capacitances placed in the electromechanical arm of the circuit, and shows results obtained with a single phase hysteresis capacitor motor (rated as 110 VAC 1/10 Hp, with the auxiliary winding motor capacitance 17 having a value of 2.4 microfarad). These tests indicate that for any given AC motor there will be optimal values for the pulse rate produced by the discharge tube, and that this pulse rate will have a maximum value for any particular value of the total capacitance placed in parallel with the pulse generator, and specifically in the electromechanical arm of the circuit, and this capacitance itself will have an optimal value. Conversely, for any given motor characteristics, a pulse generator can be designed with optimized circuit or electrical, physical and geometrical parameters.

EXAMPLE 3

With a rope-and-pulley type of torque meter, the rotor-blocked torque developed by a synchronous hysteresis motor was tested using the circuit of FIG. 3, and the same vacuum device as the previous two Examples. This type of motor was chosen because in an "ideal hysteresis" motor, the torque developed is constant at all speeds from standstill to synchronicity, locked rotor, pull-in and pull out torques being identical. Even though a single-phase capacitor-type hysteresis motor departs more from the ideal curve than a polyphase hysteresis motor does, on account of the elliptically shaped rotating fields set up by a capacitor motor, most manufacturers make permanent-split capacitor single phase hysteresis motors with identical full-load and locked rotor torques. We have utilized one such motor for our tests. FIG. 9 illustrates the range and mean of at least nine tests conducted at each of three different input direct currents into the pulse generator, the extinction voltage remaining relatively constant at about 330 VDC, with the results expressed as standstill torque developed related to the pulse rate of the pulse generator. The discharge tube was triode connected as described with reference to FIG. 3, and the total series value of the external parallel capacitance to the pulse generator was 36.6 microfarads. It is readily apparent that the torque developed is proportional to the pulse frequency as is desirable for the purposes of the present invention. The torque developed is also proportional to the voltage input into the motor (i.e. the tube output voltage) as is exemplified in FIG. 10, where tests of the PAGD-induced torque (closed squares) obtained and measured under the same conditions described for FIG. 10, over the frequency range of 11 to 45 PPS, are compared with tests of an AC 60 Hz line sine wave generated torque (shaded circles), as a function of the input volts into the motor from each source.

EXAMPLE 4

An example of the relationship of operational parameters involved in the performance of the circuit of FIG. 3 is shown in FIGS. 11 and 12, using the same pulse generator device employed in the previous Examples 1 through 3 at an air pressure of 1.75 Torr, and using the same hysteresis motor as described in the previous Examples 2 and 3. The tests of FIGS. 11 and 12 utilized a total series capacitance for the external electromechanical arm of 7.9 $\mu$fd (with reference to FIG. 3: capacitor 10=440 $\mu$fd, capacitor 11=8 $\mu$fd)). The same triode circuit was employed as in previous examples. FIG. 11 illustrates how the discharge rate of the pulse generator is controlled by the steep increase in applied DC amperes (open squares) while DC volts (closed squares) decrease to a near plateau as the pulse frequency reaches 40 pulse per second. Total wattage input to the discharge tube in the PAGD regime, at the output from the transformer secondary of the DC power supply, is shown in shaded squares. FIG. 12 shows the corresponding pulse output from the vacuum tube into the motor arm of the circuit and illustrates how the AC rms current (open squares), the AC rms voltage (open circles), the true and apparent power (respectively, closed and shaded circles) as well as the rpm of the synchronous hysteresis motor increase proportionately to the discharge rate of the pulse generator. With reference to FIG. 3, the effect of the connection to the axial member 12 through the switch 22 is to promote, other conditions being equal, an increase in discharge frequency: at these tube input and output parameters changing from a diode to a triode configuration typically increases the maximum discharge rate from 30 to 43–45 PPS.

With the triode configuration and all other conditions being unchanged, the effect of a larger total series capacitance value placed in parallel with the pulse generator, in the electromechanical arm of the circuit, is to limit the maximum pulse rate of the PAGD and the related motor parameters, as illustrated by FIG. 8.

EXAMPLE 5

When a motor is wired as a single phase motor and connected to an adjustable frequency power source, the voltage applied to the motor stator terminals should change proportionately to the change in frequency in order to maintain the constant air-gap flux that permits the motor to develop its rated torque over its speed range. A provision is thus desirably made in the power source not only to maintain a volts to pulse rate relationship which is relatively constant over an operating range, but also to maintain it at a value suited to the motor. In the present invention this is easily accomplished by adjusting the total series capacitance in the electromechanical arm of the circuit to the set value of the operating motor for any given input frequency range. Two such examples of volts per pulse per second curves as a function of PAGD frequency at the motor input are shown in FIG. 13, one (shaded circles) obtained with a squirrel cage induction motor (110 VAC, 1/20 Hp, 2 mfd auxiliary winding capacitance) and the other (open circles) with the same hysteresis motor used in the previous Examples 2 through 4. Total series capacitance values for the parallel electromechanical arm of the circuit were respectively 3 and 8 mfd. In both instances shown, the volts per cycle value tends to become a constant with increasing frequency, reaching a plateau at around 25 PPS.

In some instances, it may be appropriate to incorporate a discharge tube operating in the PAGD regime in an inverter circuit so that the pulse output may be utilized by a remotely located alternating current device. The intermittency of the pulses produced by the arrangements described above are not conducive to efficient operation of conventional transformers, and a push-pull circuit arrangement is preferred. While such an arrangement could utilize two discharge tubes, an advantageous arrangement utilizes a single tube of the type described in the parent application, as shown in FIG. 14. In this instance, both plates 8a and 8b of the tube act as cathodes and are connected to the diode 5, and the probe or auxiliary electrode, which is typically of tungsten, acts as a common anode 9 and is connected to the diode 6. The capacitors 10a and 10b are connected to opposite ends of a centre-tapped primary winding of a transformer 26, providing an alternating circuit output through a secondary winding. The centre-tap of the primary winding is connected to the electrode 9. The two halves of the primary winding inductively couple the cathode circuits in antiphase, thus synchronising the PAGD pulse trains involving the two cathodes in antiphase.

In a modification of the circuit shown in FIG. 15, the capacitors 10a and 10b are connected directly to the electrode 9, and the primary of the transformer 26 is connected directly between the two cathodes with its centre tap connected to the diode 5. Whilst this arrangement bears some superficial resemblance to known inverter circuits employing VAD devices, it should be noted that the circuit is completely self-commutating, and does not need moving external magnetic fields to provide commutation as in the prior art.

It should be understood that, using a suitable three or more phase transformer, and a vacuum discharge tube with three or more cathodes (or three or more discharge tubes), a higher pulse rate or a multiphase output may be obtained from the transformer. It should also be understood that, as shown in FIG. 16, in some applications it may be advantageous to strap the plates 8a and 8b in parallel as cathodes 8a and 8b and use the auxiliary electrode as an anode 9, in a circuit similar to that shown in FIG. 3, the tube being operated either in diode mode as shown, or in triode mode utilizing an additional auxiliary electrode.

FIG. 17 shows a modification of the circuit of FIG. 3. When the switch at node 13a is in position 25, it provides pulses only to the rotor R2 of a self-synchronous (selsyn) unit 27 in a synchro-transmitter system, in which a three phase output of the unit 27 is utilized per se, or transmitted to three phase windings of a second, slave unit 28, the windings of whose rotor R3 is closed through an external short circuit or load. Whilst rotation of the rotor R2 will provide synchronous rotation of the rotor R3 in well-known fashion, it may be advantageous to place the switch in position 24 to connect the motor 14, and to link its rotor R1 to the rotor R2 to provide this rotation, thus in turn providing remotely a corresponding rotation of rotor R3.

FIGS. 18, 19a and 19b of the drawings illustrate the construction geometry of discharge tubes which may be utilized as pulse generators such as shown in FIGS. 24a and 24b and in implementing the invention. The discharge tubes are assembled using accepted techniques which are well known to those skilled in the art of vacuum tube technology.

FIG. 18 shows a pulse generator, generally referred to by reference 50, having a cylindrical housing 52 which is preferably a glass material. Depending on the interelectrode spacing of the pulse generator, which in accordance with the invention may range from about 3 cm to about 20 cm or more, the glass housing 52 is preferably Pyrex™ or #7740 borosilicate (Corning, N.Y.). Such cylindrical housings 52 are commonly available in diameters of about 6 to about 11 cm and a variable thickness of about 0.2 to about 0.3 cm. Other borosilicate glass, quartz glass or ceramic housings can be employed as suitable alternatives to Pyrex glass and in sizes outside these commonly available ranges.

The pulse generator 50 further includes two parallel, spaced-apart electrodes comprising a cathode 54 and an anode 56, hereinafter often collectively referred to as "plates" for brevity and convenience. As noted above, the anode and cathode in pulse generators according to the invention are spaced 3 to 20 cm or more apart. The cathode 54 and the anode 56 may be either flat or curved and are preferably made of 0.5 to 2.0 mm thick aluminum, nickel or nickel alloy. The thickness of the cathode 54 and the anode 56 is not critical and any thickness within a reasonable range apparent to those skilled in the art may be used. The surface areas of the cathode 54 and the anode 56 are preferably quite large in comparison to the surface area of an anode/cathode in prior art vacuum tube devices. Surface areas which range from 16 to 256 $cm^2$ have been tested, as described in the examples hereinafter. Although the scope of the invention is not believed to be limited by this range of surface area of values, it was generally observed that the larger the surface area of the anode/cathode tested, the more readily the pulse generator 50 elicited PAGD discharges providing other conditions such as plate material, vacuum, residual gas fill, voltage and current remained constant.

The preferred material for the cathode 54 and the anode 56 is aluminum. Two specific types of aluminum are preferred; namely, H34 rolled aluminum available from the Alcan Company and Alzak TM aluminum available from the Alcoa Company. Other types of aluminum are assumed to constitute suitable material for cathode 54 and anode 56. Aluminum is a preferred material because of its low work function for field emission as well as for its other qualities such as relative freedom from sputtering, except when subjected to vacuum arc discharges, and its electrical conductivity. In all instances, the aluminum used for cathode 54 and anode 56 were degreased and rinsed in accordance with published methods familiar to those skilled in the art.

Each of the cathode 54 and anode 56 is suspended within housing 52 by a support member 58 which passes through hermetic seal 60 an opposite sides of the housing 52. The support members 58 are preferably rigid rods of substantially pure tungsten in a diameter of 1/16 th to 3/32 nd of an inch, or any suitable diameter. The material of choice is round finished PureTung TM available from Union Carbide.

The pulse generator 50 also includes at least one axial probe 62 and the pulse generator 50 shown in FIG. 18 has a tetrode geometry with two spaced-apart axial probes 62. Substantially pure tungsten rod is also the preferred material for constructing the axial probe(s). All tungsten rods used in assembling pulse generators in accordance with the invention were repeatedly cleaned with sodium nitrate and fused with a beaded sleeve of uranium glass #3320 available from the Corning Company or nonex TM glass #7720. These glasses are graded seals designed for high vacuum tungsten/pyrex junctions. Before the metal components of the pulse generator 50 are introduced into the glass housing 52, the housing is annealed at a temperature of 565° C. After the pulse generator was assembled, it was connected by a glass constriction tube to the glass manifold of a vacuum system (not illustrated).

An alternative geometry for a pulse generator in accordance with the invention includes a parallelepiped-shaped housing which is assembled using a suitable plastic polymer sheet. Polymer housings are preferably made from polycarbonate, specifically Lexan TM available from the General Electric Company. Especially preferred are the ultraviolet resistant Margard TM surface-treated Lexan TM MR5 or superior grades. The joints of the rectangular panels are preferably sealed with either a low vapour pressure resin Torr Seal TM available from the Varian Corporation which is applied along the mating edges to glue the panels or alternatively, an epoxy putty such as LePage's or MR Carbone's Handworkable Putty is first layered over the joints and then covered with translucent Scotch-Weld epoxy resin 2216B/A available from the 3M Company or another adhesive system suitable for withstanding the implosive forces of very high vacuum. For very large housings the walls are also preferably screwed together at spaced-apart intervals. Non-metallic internal braces can also be used to reinforce very large housings. The polycarbonate housings are cleaned as per manufacturer's instructions and all metal to polymer support interfaces, such as the hermetic seals where electrodes and probe(s) pass through a side wall of the parallelepiped-shaped housing are preferably epoxy resin joints made with Torr Seal TM. The vacuum constriction for connecting the housing to a vacuum pump is made of glass which is also joined to the polycarbonate surface using the Torr Seal TM epoxy resin. This alternative construction of pulse generator has a triode geometry which includes a single axial probe made of substantially pure tungsten rod. In all other respects it is the same as the pulse generator 50 described with reference to FIG. 18.

FIGS. 19a and 19b show transverse cross-sections of preferred constructions of pulse generators in accordance with the invention. FIG. 19a illustrates a cylindrical housing 52 with a flat plate anode 56 and cathode 54. As shown in FIG. 19b, the anode 56 and the cathode 54 may be elongated, transversely curved sections which are substantially semi-cylindrical in shape. This anode/cathode geometry is actually preferred for cylindrical housings. The curved electrodes may be made from laser quality reflective aluminum foil about 200 microns in thickness. Such electrodes have a current tolerance of approximately 100 mA of direct current in the PAGD regime and are destroyed by disruptive slippage into arc discharge with as little as 900 watts of applied power. Curved electrodes of press-formed aluminum plate are therefore preferred over curved electrodes made from aluminum foil.

The following examples of tests conducted with discharge tubes 50 used as pulse generators illustrate the character and performance of such pulse generators.

EXAMPLE 6

Volt-ampere Characteristics of a Pulse Generator

The tests described in this example were conducted with a pulse generator 50 (device #1) constructed with H34 aluminum flat plates (128 $cm^2$ area) set 5 cm apart, and equidistantly from a continuous axial probe 62 in a vacuum which measured $10^{-6}$ Torr at time of seal off. FIG. 2, already discussed above, shows that under conditions of a positive, constant DC voltage applied to the anode 56 of this device, the volt-ampere curve for both breakdown potential (Vb, shown as open squares) and for the minimum discharge potentials (Vs, or VAD sustaining potential and Vx, or extinction PAGD potential, both shown as closed circles) disclose two regions or regimes in the operation of this device, a region of pulsed AGD which spanned from about 10 mA to about 150 mA RMS (with an applied maximum of 15 mA DC average), and a region of VAD at RMS current values greater than 250 mA. PAGD current data was derived from peak pulse RMS values and VAD RMS current data was obtained at steady-state. Within the range of the pulsed AGD, the Vb values were high and plateaued at about 850 volts; Vb values for the VAD regime were generally lower than those of the PAGD and could be raised by an increase in available current.

A PAGD regime could also be equally identified when the supplied DC voltage was negative and applied to the same cathode plate 54 (see FIG. 18), for both PAGD and VAD, Vb and Vx values (closed and open squares, respectively) at comparable transduced pulse RMS currents. Utilizing a 10-fold higher direct current power supply, also earth-grounded at the centertap but having a parallel supply capacitance of 55 mfd and a slow voltage recovery rate (ie. less than 200 V/sec), the same pulse generator 50 (device #1) yielded 10× higher peak PAGD RMS currents (2 A vs. 200 mA) than were obtained under the same conditions and with the same power supply by a positive applied voltage of equal magnitude. These findings suggest that, at high applied direct currents, there is a strong asymmetric response of the pulse generators 50 (larger PAGD RMS current values with cathodic tension than with comparable anodic tension) with respect to the sign of the plate polarization in reference to earth-ground.

It is also apparent that the field emission responsible for the PAGD regime does not obey the Fowler-Nordheim VAD region law (see FIG. 20): whereas the VAD graph has the expected negative slope, the slope of the PAGD graph is positive, contrary to predictions by the Fowler-Nordheim VAD region law. This constitutes strong evidence for the existence of auto-electronic emission discharges that do not obey the behaviour predicted by the Fowler-Nordheim field-emission theory, the discharges occurring at much lower currents than predicted by that theory.

EXAMPLE 7

Pulse Count Rates in the PAGD Region

Two pulse count studies were done: a first at low applied direct currents ($<1.5$ mA) and a second at mid to high applied direct currents (1.5 mA to 200 mA). Peak pulse RMS currents during the second study were as high as 2 A.

At low currents, using the pulse generator 50 (device #1) assembled with H34 aluminum plates and ballasted with a 1 Mohm resistor and a lower pulse amplitude detection cut-off at less than 25V, the pulse per minute counts at the axial probe were observed to increase as the anode-supplied voltage (and the current, not illustrated), was incremented from 300 V to 500 V. At higher voltages the pulse count plateaued at a somewhat depressed level. Conversely, utilizing a pulse generator (device #2) assembled with Alzak plates in an identical vacuum at seal off ($10^{-6}$ Torr), the pulse counts increased with applied voltage up to a maximum voltage applied, the maximum pulse count being about 9 times higher than observed with device #1. Reducing the ballast resistance increased the pulse rate of device #1 to a maximum of 1000 pps, or 60,000 PPM with a 0.125 ohm resistor, and increased the pulse rate of device #2 to 4000 pps or 240,000 PPM. Analysis of the pulse signals with an oscilloscope showed that, in both instances, the observed CPM values at the axial probe 62 effectively corresponded (about 1:1) to the PPM values at the cathode 54, under these conditions for both devices #1 and #2.

At currents higher than 1.5 mA, when the PAGD regime is fully active, the inverse phenomenon was observed: i.e. the pulse rates increased with a decrease in the value of the extinction voltage (Vx). They also increased proportionally to the transduced pulse RMS current. This was observed for both positive and negative polarizations of the 'vacuum', with pulse generator 50 (device #1) Under these conditions and with a 1 Mohm ballast resistor, rates of 113-124 pps were measured, the limiting factor being the recovery time of the voltage regulation of the power supply as the current drain increased. This phenomenon was exaggerated when no ballast was employed and the largest peak pulse currents were observed. With faster recovery power supplies capable of delivering the same or higher input currents (and having the same large value of capacitance in parallel with the plates) much higher pulse rates (greater than 1,000 pps) could be obtained, along with larger peak pulse RMS currents.

EXAMPLE 8

Detection of the PAGD Region in the Pulse Generator as a Function of Decreasing Pressure Argon pumpdown tests were conducted to determine whether and when the PAGD region of the discharge was apparent utilizing comparably low voltages (up to 2.5 kv). These tests were performed with both the diffusion pump off and on. FIG. 21 shows a typical curve of the variation of the sustaining/extinction voltages at the plates with decreasing pressure at the rotary pump, from breakdown (at 860 VDC) to glow extinction, for all four pulse generators 50 examined (device #'s 3 to 6), which were assembled with H34 aluminum plates having different electrode areas: device #3, 16 cm$^2$ (small closed squares); device #4, 64 cm$^2$ (open circles); device #5, 128 cm$^2$ (open squares); device #6, 128 cm$^2$ (large closed squares). Each pulse generator 50 had the same gap distance of 5.5 cm and was assembled with the same volume of glass envelope. Devices #3 to 5 were evacuated simultaneously and an identical average direct current of 1 mA was applied to each separately, using comparable power supplies ballasted with a 1 Mohm resistor. Device #6 was evacuated in a separate test, under the same pumpdown conditions and at the same applied potential of 860 VDC at breakdown, but was subjected to a 100-fold higher, average direct current of 500 mA. It is readily apparent that the continuously varying, sustaining/extinction voltage curves shown in FIG. 21 are analogous to the Paschen gas breakdown voltage curve and that throughout most of the voltage range all three low current curves are parallel. Independent determinations of the low current breakdown voltage curves for all three pulse generators 50 (devices #3 to 5) showed the exact same relation for all three curves as observed for the sustaining/extinction voltage curves (results not shown). The differences between the electrical discharge regimes observed as a function of decreasing pressure are most apparent in the larger plate area pulse generator 50 (device #5). The three regions of the discharge, the transitional glow, the normal glow and the pulsed abnormal glow, are clearly distinguishable for that device (see FIG. 21). In the transitional region discharge (TRD), the cathode glow is of minimal point-like size and rapid oscillations of the striations of the plasma positive column originate quasi-sinusoidal, dampened sinusoids, ramp-like or noise-like waveforms associated with sporadic, small amplitude (2 to 15 volts), pulsed auto-electronic emissions. In this region the voltage tends to fall, while oscillating erratically at first. As the pressure further decreases, there follows a stable normal glow discharge (NGD) region, where conduction of different current across the vacuum pre-empts the possibility of auto-electronic emission the lowest voltages are observed in this region. After the recession of the positive column and upon glow saturation of the plate areas, just as the cathode glow is beginning to recede (pre-Cooke's 'post-cathodic' phase), the intense, large amplitude (>100 V), pulsed auto-electronic emission characteristic of the PAGD regime emerges. In this region, the voltage tends to climb until extinction occurs before the maximum voltage of 860 V is again attained. In the other two devices, the borders of the discharge regimes are blurred. In device #3, the low emissions intensity, small amplitude auto-electronic develop into a few high intensity, large amplitude emissions, as they decrease in frequency and with considerable overlap; the PAGD and NGD regimes are also mostly mixed, until lower pressures of the order of 0.01 Torr are attained, at which point the PAGD regime functions alone at low frequency. In device #4, the NGD regime can be better distinguished from the TRD, and the PAGD from the NGD, but high intensity, large amplitude auto-electronic emissions occur early on in the NGD region as the glow saturates the plates faster than for device #5. There is a dual effect on increasing the average applied direct current 100-fold (device #6, large closed squares, shown in FIG. 21): the entire ascending arm of the voltage curve is displaced upward in the pressure scale and the distribution of the voltage variation is compressed. The high applied direct current also abrogates the two discharge regions adjacent to the PAGD. From breakdown to extinction, the regime of the discharge is solely that of the PAGD, the positive column of the discharge weakening with the decreasing pressure. However, if the cathode is hot enough, a quasi-thermionic 'post-cathodic' glow may also briefly occur after the PAGD regime and before glow extinction.

FIG. 22 shows the pulse rates for the observed intense large amplitude, auto-electronic emissions characteristic of the PAGD regime, which correspond to the voltage curves for devices #3 to 5 obtained above as described for FIG. 21. In all three devices, the PAGD regime first appeared mixed together with the NGD regime in the form of pulses that perturbed the steady-state glow, the pulses increasing in frequency with the decreasing pressure until a maximum pulse rate was attained.

In FIG. 23, the effect on the PAGD regime of increasing the current 500-fold (from 1 to 500 mA), while keeping the potential constant using the same 128 cm$^2$ plate area pulse generator 50 (device #6) during two other separate evacuations with the rotary pump, is shown. The higher current displaces the PAGD region upward in the pressure scale, just as was observed in the ascending arm of the voltage curve (see FIG. 21). The displacement inducted by the applied high current occurs over a pressure range where, at low current (1 mA) and with the same applied potential at breakdown, some weak, low-amplitude, pulsed auto-electronic emissions are observed during the TRD.

The effect of increasing the starting DC voltage at breakdown by 1.75-fold (from 860 to 1507 VDC) was observed using device #3 in two separate tests. The increased current displaced the PAGD upper pressure limit downward in the pressure scale, in opposition to the current effect and it also increased the frequency of the intense, large amplitude, auto-electronic emissions by a factor of about 8.8.

Using the same applied low direct current and potential magnitude at breakdown (860 VDC) described for the tests represented in FIGS. 21 and 22, pumpdown of the three different plate area pulse generators 50 (each having interelectrode distances of 5.5 cm) was performed with the oil diffusion pump on. While the effect of increasing the plate area under these conditions remained the same, i.e. lowering the pressure for the same sustaining/extinction potential and displacing the PAGD region to regions of higher vacuum, there was a noticeable difference compared with the same test done with the rotary pumpdown: i.e. the extinction pressure was greatly extended downward in the pressure scale for all devices, and, consequently, the PAGD region was greatly expanded into the medium to high vacuum ranges. A 128 cm$^2$ plate area pulse generator 50 with 5.5 cm gap, (devices #11 and 12) typically reached PAGD extinction at $5*10^{-5}$ Torr, though its peak pulse rate remained basically unchanged. This overall displacement of the PAGD phenomenon to higher vacuum regions under conditions of oil diffusion evacuation may well be due to the migration of very low vapour pressure oil molecules to the tube ends (despite the baffle and the cooling trap) and their interaction with residual gas molecules in the electrical field of the devices. With the diffusion pump on and voltages progressively increasing up to 2.5 kV with decreasing pressure, the PAGD regimes in these pulse generators 50 operated from $10^{-3}$ to $10^{-5}$ Torr. Typically a 128 cm$^2$ H34 aluminum plate pulse generator 50 (5.5 cm gap) will operate in the PAGD regime at $2*10^{-5}$ Torr, with an applied voltage of 2.2 kV and at a pulse rate of 30 pps. With higher vacua ($<10^{-5}$ Torr) and voltages, the 'post-cathodic' PAGD gives way to the production of cathode rays and very weak x-rays. From several such diffusion pumpdown tests it was concluded that the PAGD was facilitated by the use of Alzak electrode material and, as it will be shown in Example 9, by larger plate areas.

EXAMPLE 9

The Effect of the Plate Area on the PAGD Characteristics during Pumpdown

The effect of increasing the plate area of the cathode 54 and anode 56 of a pulse generator 50 was tested by two methods: 1) using a pumpdown method of varying the vacuum with a rotary pump (as explained below) and 2) using sealed housings 52, 64 enclosing a vacuum of $2*10^{-6}$ Torr obtained with the diffusion pump (see Example 10).

The results from the first test is shown in FIGS. 21 and 22, for the pulse generators 50 stimulated with low (1 mA) direct currents, at the same starting potential of 860 VDC at breakdown. A comparison indicates that the effect of increasing the plate area in pulse generators 50 having the same gap distance, and thus the same pd value (pressure, in Torr, multiplied by interelectrode gap distance, in cm), and the same volume, is to depress the voltage, particularly in the NGD and PAGD regions and to displace the auto-electronic pulsed emission characteristic of the PAGD regime to a higher vacuum range. The peak frequency of PAGD for each given area is also attained, in each case, at a vacuum that increases proportionately to the order of increasing area (16→64→128 cm$^2$) as does the magnitude of the peak frequency of PAGD for a given gap distance. The distribution of PAGD frequencies also narrows its characteristic mode with the larger area plates, by displacing an upper pressure limit to lower pressure regions, the most significant shift in this respect being from the 64 to the 128 cm² devices (FIG. 12, open circles vs. open squares). This distribution compression shift corresponds to a better definition between the NGD and the PAGD regimes afforded by the pulse generator 50 with the largest plate area employed (128 cm²), as discussed above in Example 8. Moreover, in accordance with Paschen's law, the observed area-dependent voltage reduction effect cannot be explained, inasmuch as the voltage is predicted to remain the same as long as the product pd is constant even if the plate area increases. Since the interelectrode gap distance was constant for all devices and as the pumpdown was also performed simultaneously, it is apparent that there is an electrode plate area effect which is not accounted for by Paschen's law. The observed plate area effect appeared to have an effect opposite to current and in the same direction of increasing potential, as it displaced the PAGD region downward in the pressure scale and increased the PAGD frequency. In addition, an increase in area also reduces the magnitude of the potential. From the results obtained, it is apparent that an increase of 1.75 fold for a given breakdown potential of a 16 cm² pulse generator yields the same pulse rate (about 60 pps) as does an 8 fold increase in plate area for the same volume housing (52, 64), but requires a lower pressure.

A comparison of breakdown order and pressure, as well as of peak pps values and peak pps conditions carried out as a function of plate area for the pulse generators 50 (devices #'3 to 5) represented in FIGS. 21 and 22, showed that the pulse generator 50 with the largest plate area, which was the first to undergo breakdown (during six separate tests) at the highest pressure of 3 Torr, yields an 8 fold higher PAGD rate than the pulse generator 50 with the smallest plate area of 16 cm², at the lowest pressure (the pressure is 24 times lower than that of the 16 cm² device). This peak pps rate occurs, however, at a voltage which is about 9.5% greater for the pulse generator 50 with the largest plate area. These results suggest that a larger plate area promotes breakdown at higher pressures (i.e. the breakdown pressure decreases inversely to the order of increasing plate area) and supports lower sustaining/extinction voltages.

In conclusion, the effect of increasing the plate area of pulse generators stimulated with the same starting voltage and the same current is to: 1) shift the breakdown pressure upwards, 2) depress the working voltage, 3) increase the pulse rate both in the TRD and the PAGD regions, 4) shift the PAGD region downwards in the pressure scale and segregate the discharge regimes more clearly as a function of decreasing pressure. These observations also explain why the pulse generators with smaller plate area shift the PAGD up in the pressure scale, as an increase in current does. Effectively, a smaller plate area not only concentrates the lines of electrostatic force in a vacuum, but it also increases the current density per unit area, with the consequent glow saturation of the plates, necessary for the abnormal glow discharge region to be attached, occurring earlier on during pumpdown, than for pulse generators with larger plate areas.

EXAMPLE 10

The Effect of Plate Area on the PAGD Characteristics of Pulse Generators Enclosing a High Vacuum The second method used to test the effect of increasing the electrode plate area in the design of a pulse generator 50 made use of glass housings 52 enclosing a final vacuum of $2*10^{-6}$ Torr obtained with a diffusion pump on. These tests were performed with high direct currents (200 mA to 1 A). All pulse generators tested (devices #'s 7 to 13) had an interelectrode gap distance of 5 cm, enclosed the same volume and the same vacuum, and were assembled at H34 aluminum plates having plate areas which varied by an area factor of $k_A=2$, namely: 64, 128 and 256 cm². Originally the test was performed with a series with a $k_A=2^2$ factor, the plate areas being described by $2^4$, $2^6$, $2^8$ or 16, 64 and 256 cm². However, at a seal off vacuum of $2*10^{-6}$, the first two pulse generators 50 of this series (16 and 64 cm², devices #'s 7 to 10) remained unresponsive (no signs of discharge). Even when 3.3 kV was applied, one of the 64 cm² pulse generators showed only a faint glow (also see discussion of results for groups #1 and #4 of Table 5 below). The results for the $k_A=2$ series indicate that when the current, the interelectrode distance and the pressure are all kept constant, the breakdown potential (Vb) for the PAGD decreases with an increase in plate area. For the largest plate area tested (256 cm²), the PAGD breakdown (287 V) and extinction (Vx=284 V) voltages practically coincide, suggesting that larger areas might depress both Vb and Vx still further. These results were recorded under identical conditions of applied direct current (200 mA), of peak pulse RMS current and of pulse frequency (20 pps) using an earth-grounded centertap power supply with both positive and negative voltages applied simultaneously to the respective plates. Under the same conditions of applied total power same starting voltage, but higher applied direct current because of their lower sustaining/extinction voltage), three pulse generators 50 built with Alzak plates having areas of 64, 78 and 128 cm² respectively were tested with the same power supply.

These pulse generators conduct 5-fold higher DC currents, transduce 3-fold higher peak pulse RMS currents and yield a 20 to 30-fold increase in pps (from 20 to 600 pps) at similar field strengths, when compared with the results obtained using hardened aluminum plates.

A comparison of pulse counts at the axial probe 62 (see FIGS. 18 and 19) in pulse generators 50 and the pulse counts at the cathode 54 showed that the axial probe 62 accurately reflects interelectrode events. This correspondence was confirmed using oscillographic analysis of the probe waveform, which showed it to be functionally equivalent to that measured at the cathode 54.

Typically, for a closed high vacuum pulse generator 50 with a plate area of 128 cm² and an interelectrode gap of 5 cm, a breakdown voltage of 668 volts, an average applied current of 500 ma, and at 200 pps, the pulse amplitude is more than 300 volts. Under rotary pumpdown conditions and for an identical pulse generator, the pulse amplitude (encompassing both positive and negative components, the latter being the prominent value) increases with decreasing pressure, from 60 volts at about 0.5 Torr (with 5 mA DC) to >300 volts at 0.008 Torr. In the closed high vacuum pulse generator with H34 plates having an area of 128 cm² (device #1), higher resolution oscillographs taken at the axial probe 62, show that the negative component precedes the positive reversal and has a typically higher amplitude (140 V vs. 80 to 120 V, respectively, for example). Clearly, upon an abnormal glow discharge pulse, the recovery of the field strength within these pulse generators overshoots a 'closed switch state' (where the current I~O) and results in a net flow of positive charge past the probe, towards the cathode (which is the floating ground reference level for these measurements).

EXAMPLE 11

Effect of Capacitance on PAGD Rate

Using the same breakdown voltage of about 668 VDC, the effect of varying the capacitance of the power supply, set in parallel with the pulse generator (device #1), on the frequency of PAGD production was determined while maintaining all other variables constant (interelectrode gap, plate area, applied voltage and current levels). Linear regression shows that, under these conditions, the PAGD frequency is increased by lower capacitances. The log slope indicates that the pps rate is doubled as the capacitance decreases by ⅔ rds. Measurements were also taken of the 'non-dynamic' capacitances of pulse generators with H34 aluminum plates having different plate areas. These were insignificant when compared with the parallel capacitances used in the power supply, used in the tests, and were observed to vary in accordance with the dielectric law, i.e. doubling the plate area doubled the capacitance. This can be seen in the Table below:

| Plate area: | Capacitance: |
|---|---|
| 64 cm² | $1*10^{-12}$ F |
| 128 cm² | $2.05*10^{-12}$ F |
| 256 cm² | $4.1*10^{-12}$ F |

Optimum Arrangement and Geometry

Prolonged operation of the pulse generators 50 has provided the geometries for eliciting PAGD production including:

1) It is advantageous if the discharge does not wander to the back of the anode 56/cathode 54 and this is facilitated by using semi-cylindrical anode 56/cathode 54 in cylindrical housings 52 and flat anode 54/cathode 56 (rectangular, square or circular) in parallelepiped-shaped housings. However interelectrode gap tests are best done with flat plates which assure an homogeneous potential. Moreover, the semi-cylindrical electrodes are best made of hardened aluminum, at least 0.5 to 1 mm thick, and this requires forming them to the right curvature, given that foil alternatives are not resistant to the deleterious effect of high-current PAGD transduction at very high frequencies and do not withstand disruptive VAD discharges. Nonetheless, a semi-cylindrical electrode configuration in a housing 52 makes the sheaths (where ionic recombination occurs during glow discharge) near the electrodes and the housing wall coincide, and this can be highly advantageous for sustaining PAGD production. The same applies to flat plates in flat surface parallelepiped housings.

2) The most effective axial probe 62 is either a single half-length rigid rod or a pair of axial probes 62 separated at the center of the pulse generator 50 by a gap of more than 1 cm, 4–6 cm being optimum. Whereas an axial wire will perform satisfactorily as a probe 62, the rigid rod has the advantage of not yielding to a direct mechanical transduction of the electrodynamic force effected upon it by the discharge or to force created by the acquisition of a constant space charge. A split axial probe 62 facilitates the exciter function and assures PAGD operation by preventing a formation of a stable axial space-charge at high-current operation.

3) A cooling coil (made of rubber, polymer, glass or copper tubing) surrounding housing 52 is useful to counterbalance the heating of the anode 56/cathode 54 which promotes the production of semi-thermionic VAD channels and even thermionic normal glow discharges, specifically at applied currents of more than 200 mA during PAGD operation. A coolant pipe system that weaves through the plates can also be used for this purpose, in which case flat plates are preferred.

4) Larger anode 56/cathode 54 surfaces are required as the interelectrode gap is increased. And inversely, larger anode 54/cathode 56 surfaces operate best (i.e. require the lowest applied voltages) if larger interelectrode gaps are used; however, the breakdown voltage also increases with larger interelectrode gaps.

5) One of the limitations of these pulse generators stems from their continuous operation at high applied currents and from eventual slippage into the VAD regime, both of which promote a deposit of sputtered metal atoms on the inner walls of the housing 52 thereby making them conductive. In order to minimize this problem, electromagnets may be wound longitudinally over the housing 52 (one at each end), to limit the dispersion of the discharge vortices.

Factors Affecting PAGD Production

It is apparent that several factors affect PAGD production namely: cold cathode work function, voltage, current, parallel capacitance, gas fill, pressure, geometry plate area and interelectrode gap distance. Except for capacitance at the high end of the scale, each of these factors affect the high and low limits of the PAGD, for any given set of conditions. Heretofore, factors such as plate area in vacuum tubes have not been previously identified as factors which affect the breakdown field values and the sustaining/extinction potentials of a glow or an arc discharge. This suggests that the observed auto-electronic field emission in the PAGD regime is a function of physical factors which to date have been unrecognized. It further suggests that field emission is not a property exclusive to the VAD, i.e. that it is also a property of the pulsed operation of an abnormal glow discharge in low to very high vacua.

The present pulse generators 50 provide an optimal design capable of transducing high peak pulse currents at very low field strength, over a wide range of frequencies with minimal slippage of the PAGD operation into either the NGD or the VAD regimes.

In conclusion, we have disclosed a series of low to very high vacuum pulse generators which support the production of PAGDs. In testing these devices we have shown that:

the low field strengths and typical low emission current densities observed in the PAGD regime are not predicted by any existing field emission or space-charge theories;

the PAGD regime responds asymmetrically to the polarity of the applied voltage at high applied currents;

at low applied currents, the PAGD pulse rate increases with the applied voltage and the current up to an observed plateau;

at mid to high applied currents, the PAGD pulse rate increases with an increase in current and with a lowering of the extinction potential;

the PAGD pulse rate also varies with the composition of the cathode material (the pulse rate is promoted by materials having a low work function) and increases with a decrease in pressure, during pumpdown, to a maximal peak rate, thereafter either diminishing to the point at which the discharge extinguishes or gives way to x-ray production (depending on the magnitude of the applied potential);

larger area plates lower the field strength values needed to elicit comparable PAGD production, displace the PAGD region downward in the pressure scale and increase the peak PAGD rate;

higher power supply capacitances slow down the PAGD rate.

We claim:

1. A direct current power transducer comprising a cold cathode vacuum discharge tube having an anode and a cathode and capable of autoelectronic emissions under abnormal glow discharge conditions, which emissions have an extinction potential substantially higher than the sustaining potential of a vacuum arc discharge in the same tube, and an external circuit including a direct current source connected between the anode and the cathode, the external circuit being capable of developing a potential sufficient to initiate said autoelectronic emissions, and an impedance sufficient that, as the autoelectronic emissions are established, potential between the anode and the cathode collapses below said extinction potential before a vacuum arc is established, thus setting up an endogenous cyclical pulsed abnormal glow discharge, wherein the external circuit includes a reactive arm in parallel with the discharge tube and presenting a capacitance across the tube, said reactive arm further including an electromagnetic device providing an energy output and dependent on the application of cyclical power pulses for its operation.

2. A transducer according to claim 1, wherein the electromagenetic device comprises a rotary electric motor having a stator converting cyclical power pulses into a rotating magnetic field and a rotor rotating in that field.

3. A transducer according to claim 2, wherein the motor is a synchronous motor.

4. A transducer according to claim 2, wherein the motor is an asynchronous induction motor.

5. A transducer according to claim 2, including electric motors connected in tandem.

6. A transducer according to claim 2, including plural discharge tubes connected in tandem.

7. A transducer according to claim 1, including at least one auxiliary electrode influencing emissions within the tube.

8. A transducer according to claim 7, including a connection between said auxiliary electrode and said external circuit to affect an operational parameter of the transducer.

9. A transducer according to claim 1, including at least one auxiliary electrode influencing emissions within the tube, and a connection between that auxiliary electrode and a point within the reactive arm selected to increase a cycling rate of the pulsed abnormal glow discharge.

10. A transducer according to claim 1, wherein the tube contains multiple cathodes and a common anode, and the external circuit is configured to develop a potential sufficient to initiate autoelectronic emissions between the anode and each cathode in turn to produce multiple endogenous cyclical pulsed abnormal discharges, the effects of which are combined in the external circuit.

11. A transducer according to claim 10, wherein the tube contains two cathodes and the external circuit provides both capacitance between each cathode and the anode and inductances coupled in antiphase between the cathodes.

12. A transducer according to claim 1, wherein the electromagnetic device is a synchro-transmission system providing a remote output.

13. A transducer according to claim 1, wherein the electromagnetic device is a transformer.

* * * * *